United States Patent
Chatfield et al.

(10) Patent No.: US 11,692,533 B2
(45) Date of Patent: Jul. 4, 2023

(54) APPARATUSES, SYSTEMS, AND METHODS FOR IMPROVED PERFORMANCE OF A PRESSURIZED SYSTEM

(71) Applicant: OPTIMUM Power Technology, L.P., Morgan, PA (US)

(72) Inventors: Glen F. Chatfield, Bradfordwoods, PA (US); John G. Crandall, North Versailles, PA (US); Dale K. Wells, Eighty Four, PA (US)

(73) Assignee: Optimum Power Technology, L.P., Morgan, PA (US)

( * ) Notice: Subject to any disclaimer, the term of this patent is extended or adjusted under 35 U.S.C. 154(b) by 0 days.

(21) Appl. No.: 17/577,914

(22) Filed: Jan. 18, 2022

(65) Prior Publication Data

US 2022/0136493 A1  May 5, 2022

Related U.S. Application Data

(63) Continuation of application No. 16/278,804, filed on Feb. 19, 2019, now abandoned, which is a continuation of application No. 14/176,015, filed on Feb. 7, 2014, now abandoned, which is a continuation of application No. 12/686,017, filed on Jan. 12, 2010, now abandoned, which is a continuation-in-part of application No. 12/189,630, filed on Aug. 11, 2008, now Pat. No. 9,567,996.

(Continued)

(51) Int. Cl.
| | | |
|---|---|---|
| *F04B 27/053* | (2006.01) | |
| *F04B 41/06* | (2006.01) | |
| *F04B 27/02* | (2006.01) | |
| *F04B 39/00* | (2006.01) | |
| *F04C 23/00* | (2006.01) | |

(52) U.S. Cl.
CPC ............ *F04B 27/053* (2013.01); *F04B 27/02* (2013.01); *F04B 39/0027* (2013.01); *F04B 41/06* (2013.01); *F04B 2205/13* (2013.01); *F04C 23/001* (2013.01)

(58) Field of Classification Search
CPC ...... F04B 11/00; F04B 11/005; F04B 23/001; F04B 27/005; F04B 27/02; F04B 27/053; F04B 27/0536–0538; F04B 39/0027; F04B 41/06; F04B 2205/13; F04C 23/001
USPC ......... 123/52.4, 52.6, 53.2, 54.2, 54.3, 54.6, 123/55.2, 55.5, 55.7, 59.6; 417/237, 257, 417/266, 267, 269, 273, 312, 415, 418, 417/419, 534–537, 539
See application file for complete search history.

(56) References Cited

U.S. PATENT DOCUMENTS

| | | | | |
|---|---|---|---|---|
| 531,552 | A | * 12/1894 | Miles | F04B 27/02 92/175 |
| 646,031 | A | * 3/1900 | McKinnon | F04B 1/053 417/454 |

(Continued)

FOREIGN PATENT DOCUMENTS

| | | | |
|---|---|---|---|
| EP | 0836004 | A2 * | 4/1998 |
| GB | 412889 | A * | 7/1934 |

(Continued)

*Primary Examiner* — Alexander B Comley
(74) *Attorney, Agent, or Firm* — Richard W. James

(57) ABSTRACT

A natural gas pumping system that includes six reciprocating compressor cylinders, the reciprocating pistons of the six compressors having cycles offset by 60 degrees one from another.

13 Claims, 12 Drawing Sheets

Related U.S. Application Data

(60) Provisional application No. 61/143,974, filed on Jan. 12, 2009, provisional application No. 60/954,914, filed on Aug. 9, 2007.

(56) References Cited

U.S. PATENT DOCUMENTS

| | | | | |
|---|---|---|---|---|
| 1,435,224 A | * | 11/1922 | Gensecke | F04B 27/02 92/160 |
| 1,690,144 A | * | 11/1928 | Teasdale | F02B 75/222 123/54.2 |
| 1,818,413 A | * | 8/1931 | Luitwieler | F04B 27/02 92/138 |
| 1,951,751 A | * | 3/1934 | Cooper | F04B 39/128 91/476 |
| 2,170,151 A | * | 8/1939 | McCarthy | F01L 5/06 123/54.2 |
| 2,312,335 A | * | 3/1943 | Halleck | F04B 39/06 417/267 |
| 2,760,439 A | * | 8/1956 | Crookston | E21B 3/02 188/274 |
| 3,233,554 A | * | 2/1966 | Huber | F04B 25/005 92/138 |
| 3,238,889 A | * | 3/1966 | McCartney | F04B 9/04 92/138 |
| 3,474,768 A | * | 10/1969 | Anesetti | F02B 75/246 123/192.2 |
| 3,520,285 A | * | 7/1970 | Klauder, Jr. | F02B 75/246 123/197.1 |
| 3,694,109 A | * | 9/1972 | Walls | F04B 39/08 417/510 |
| 3,834,840 A | * | 9/1974 | Hartley | F04B 39/00 417/535 |
| 4,030,860 A | * | 6/1977 | Standlick | G05D 11/132 417/349 |
| 4,370,953 A | * | 2/1983 | Van de Walker | F02B 75/22 123/54.6 |
| 4,373,876 A | * | 2/1983 | Nemoto | F01B 1/08 417/539 |
| 4,598,628 A | * | 7/1986 | Courtright | F04B 17/02 417/334 |
| 4,787,342 A | * | 11/1988 | Matsumori | F02M 35/116 123/54.6 |
| 6,123,516 A | * | 9/2000 | Burghard | F04C 28/28 417/267 |
| 6,202,537 B1 | * | 3/2001 | Havran | F04B 27/02 92/72 |
| 7,503,291 B2 | * | 3/2009 | Gamble | F04B 39/128 123/197.3 |
| 7,552,707 B2 | * | 6/2009 | Fisher | F04B 27/02 123/48 B |
| 2008/0298984 A1 | * | 12/2008 | Barberis | F04B 39/06 165/104.34 |

FOREIGN PATENT DOCUMENTS

| | | | |
|---|---|---|---|
| JP | 2003519740 A | * | 6/2003 |
| JP | 2005188482 A | * | 7/2005 |
| JP | 4347684 B2 | * | 10/2009 |
| WO | WO-2008010490 A1 | * | 1/2008 |

* cited by examiner

APPARATUSES, SYSTEMS, AND METHODS FOR IMPROVED PERFORMANCE OF A PRESSURIZED SYSTEM

CROSS-REFERENCE TO RELATED APPLICATIONS

The present application is a continuation of U.S. patent application Ser. No. 16/278,804, which is a continuation of U.S. patent application Ser. No. 14/176,015, filed Feb. 7, 2014, which is a continuation of U.S. patent application Ser. No. 12/686,017, filed Jan. 12, 2010. Application Ser. No. 12/686,017 claims priority to U.S. provisional patent application Ser. No. 61/143,974, filed Jan. 12, 2009, and is a continuation-in-part of U.S. patent application Ser. No. 12/189,630, filed Aug. 11, 2008, now U.S. Pat. No. 9,567,996. All of the above referenced applications are incorporated herein in their entireties.

FIELD OF THE INVENTION

The present invention is concerned with reducing pulsations in fluid systems.

Embodiments of the invention also increase fluid flow, reduces power consumption, or both over traditional systems, resulting in smoother, more efficient fluid flow in a closed system.

BACKGROUND OF THE INVENTION

The theory of cyclical finite amplitude pressure wave propagation in pipes is discussed, for example, in Professor Gordon P. Blair's book "Design and Simulation of Two-Stroke Engines" and will not be repeated in detail in this application. Rather, the following is a summary of some of the underlying principals of physics that this invention exploits:

1. There are always two waves propagating in opposite directions within a pipe that has flow.
2. The convention is to call one wave the right wave and the other wave the left wave.
3. The two waves superimpose upon each other and create the pressure that can be measured by a pressure transducer.
4. It is not possible to measure the right or left wave separately, however they can be tracked, for example, by a one-dimensional gas flow simulation software developed by OPTIMUM Power Technology.
5. Both waves propagate without reflection if the cross sectional area of the pipe stays the same.
6. When the cross sectional area of the pipe changes, part of the wave continues to propagate and the remainder of the wave reflects in the opposite direction.
7. When pipes branch or terminate, part of the wave continues to propagate and the remainder of the wave reflects in the opposite direction.

As a result of these phenomena, a compressor creates pulsations that propagate away from it and piping that attaches to both the suction and discharge sides of the compressor create pulsations that propagate back to the compressor, affecting compressor performance.

By properly phasing the cylinders of the compressor and/or properly choosing the lengths and diameters of pipes in fluid communication with the compressor, outward bound pulsations can be attenuated and inward bound pulsations can used to improve the performance of the compressor.

A fluid, whether gaseous or liquid, may flow through a conduit or duct. The fluid may be propelled by a pressure creating device, such as a compressor or other type of pump. One type of compressor used to propel fluid, particularly gas, is a reciprocating compressor. The pressure and flow delivered by reciprocating compressors varies throughout the stroke of each compressor cylinder piston, thus creating pressure waves or pulses that propagate at acoustic velocity throughout the attached piping system. Effective control of the pressure pulsations generated by reciprocating compressors is desirable for various reasons, including to prevent damaging forces and stresses in system piping, vessels, and mechanical equipment and structures, and to prevent detrimental time-variant suction and discharge pressures at or near the compressor cylinder flanges.

A reciprocating compressor may have a piston that is moved alternately toward one end of a cylinder and then to an opposing end of the cylinder and fluid may be propelled from the cylinder by the piston in either one or both directions of piston movement. A piston that propels fluid when moving in only one direction may be referred to as single-acting piston, while a piston that propels fluid when moving in both directions may be referred to as a double-acting piston. Double-acting pistons compress gas at the discharge of the compressor using both strokes of the piston, while single acting pistons compress gas at the discharge of the compressor using only one stroke of the piston. Exemplary double-acting compressors are those manufactured by Ariel Corporation of Mount Vernon, Ohio.

The pumping action of each single-acting or double-acting piston creates complex cyclic pressure waves. The pressure waves of a double-acting piston generally have a primary frequency at twice the compressor operating speed with many harmonics. Variations in pressure within conduits and ducts created by such pumping actions are commonly referred to as pulsations.

In a typical fluid pumping system (e.g., a natural gas pumping station), wherein the pumping is performed by one or more reciprocating compressors, pressure pulsations are controlled with a system of primary and/or secondary volume bottles, often with complex internal choke tubes, baffles, and chambers, as well as various orifice plates installed at various locations in the system piping. Those pressure pulsation control devices are thought to accomplish pulsation control by adding resistance, or damping, to the system, and their use results in pressure losses that typically exist both upstream (or in a direction away from the compressor cylinders) and downstream (or in a direction toward the compressor cylinders) of the compressor cylinders. For common pipeline transmission applications, particularly those having low pressure ratios between their inlets and outlets, such as natural gas pipeline systems, pressure losses can noticeably degrade system operating efficiency. As larger high-speed compressors have been increasingly applied to pipeline transmission applications, the influences of existing pressure wave or pulsation control devices are thought to have become more detrimental to performance, because of the higher frequency pulsations that must be damped in such high-speed compressors. In certain cases, installed systems using traditional methods of pulsation control have been reported to add 20 percent or more to the driver horsepower requirements for high-speed, low-ratio compressors.

Commonly, in systems such as natural gas pipeline systems, bottles are employed near the outlets of their compressors to dampen pulsations close to the fluid source. In addition to the drawbacks of using bottles to control pulsation as described above, bottles are commonly very bulky. A natural gas pipeline or other system that eliminated, decreased, or did not rely exclusively on bottles to address pulsation may overcome certain drawbacks. Thus, a natural gas pipeline or other system that addressed pulsation by attenuating pulses at various positions along the pipeline without significantly affecting efficiency of the system may be desirable.

Study has been made as to the effect of the use of differing length parallel tubes to cancel sounds of a particular wavelength. Acoustic wave interference in pipes was studied in 1833 by Herschel, who predicted that sound could be canceled by dividing two waves from the same source and recombining them out of phase after they followed paths of different lengths. Experiments by Quincke in 1866 verified that Herschel's system did suppress sound.

Variations on the Herschel-Quincke solutions have been proposed including a method for controlling exhaust noise from an internal combustion engine by using bypass pipes such as shown in U.S. Pat. No. 6,633,646 to Hwang (hereinafter "Hwang"). See FIG. 1 and FIG. 5 of Hwang. In such an apparatus, a main exhaust pipe is provided with two U-shaped bypass pipes through which the exhaust passage of the main pipe is partially diverted before being reintegrated. With such a construction, the phase difference between the main noise components of the exhaust gas passing through the fixed pipe and the noise components of the exhaust gas passing through the first bypass pipe is adjusted 180 degrees, thus suppressing the main noise component and its odd harmonics. The length of the second bypass pipe is adjusted so that the noise component having a frequency of two times the frequency of the main noise component is suppressed. However, the above method does not effectively attenuate the 4th harmonic, i.e., the noise component having a frequency four times the main noise component, nor any other harmonics divisible by 4. Such an arrangement furthermore operates on a single primary frequency and certain of its harmonics and so is unlikely to provide effective noise attenuation over a range of noise frequencies. Furthermore, Herschel, Quincke, and Hwang directed their efforts toward sound attenuation, not improvement of system integrity and performance. While attenuation of sound and pulsations may be achieved by similar means, they operate differently by degrees to achieve different results. For example, reduction of sound is frequently directed to human comfort and reduction of high frequency wavelengths that are bothersome to human beings. Conversely, pulsation reduction frequently focuses on reducing low frequency wavelengths that may cause damage to mechanical systems, such as pipes, conduits, ducts, mechanical equipment and structures, sometimes in critical safety applications such as natural gas pipelines.

U.S. Pat. No. 5,762,479 to Baars et al. (hereinafter "Baars") is directed to a discharge arrangement for a reciprocating hermetic compressor of the type used in small refrigeration systems. That arrangement includes a gas discharge tube through which gas flows from a gas discharge chamber. To attenuate a pulse at a certain frequency, part of the gas flow from the gas discharge chamber is displaced through a gas discharge auxiliary tube. The lengths of the gas discharge tube and gas discharge auxiliary tube differ by a fraction, preferably half, of the length of a wave at that frequency. As such, when the gas flow in the gas discharge tube and gas discharge auxiliary tube join, the pulse is attenuated.

Baars does not, however, address system performance such as gas flow rate or efficiency. Additionally, Baars only addresses attenuation of a pulse at a single frequency, and does not attenuate pulses at any other fundamental or harmonic frequencies. Additionally, there may be a need for a pulsation attenuation apparatus, system, and method that attenuates pulses at multiple frequencies and, unlike Baars, is directed to natural gas pipeline systems.

U.S. Pat. No. 3,820,921 to Thayer (hereinafter "Thayer") is directed to a hermetic refrigerator compressor with radially-configured cylinders. Thayer discloses a six-cylinder discharge arrangement in which the first three cylinders have discharge tubes that connect side-by-side at a joint to one common discharge line, and the other three cylinders have discharge tubes that connect side-by-side at a joint to a second common discharge line. The discharge tubes may be of unequal length to reduce noise including that caused by vibration and resonance at certain frequencies. That configuration may minimize the need for mufflers, and may increase compressor efficiency. The side-by-side relationship at the connection point at the joint is said to create an aspiration effect in the joint by which gas being discharged from one of the cylinders helps to withdraw the discharge pulses from the opposing cylinder.

Thayer is directed to noise reduction in a hermetic refrigerator compressor with radially-configured cylinders and does not go to improving performance of a compressor with in-line cylinders, such as those sometimes used in natural gas pumping. Thayer is further directed to an apparatus having a single joint in which flows are combined and arranged to create an aspiration effect, not a system that combines flows at two or more locations in series to improve compressor performance by attenuating various pressure variations. Accordingly, there may be a need for a pulsation attenuation that improves the performance of a compressor in a system such as a natural gas system.

Furthermore, the Thayer system does not recognize the wave reflection issue created by its joint. At discontinuities in the pipe flow conditions and geometry, such as at junctions of multiple routes of fluid flow and with respect to diameter changes, wave reflection normally occurs. Where the discontinuity is introduced close to the outlet of a compressor, such as in Thayer, the reflected portion of a wave may significantly affect the pressure at the outlet of the compressor. Thayer fails to address that issue. Additionally, there may be a need for a pulsation attenuation apparatus, system, and method that addresses that issue and further is, unlike the hermetic refrigerator compressor in Thayer, directed to natural gas pipeline systems.

Thus, certain embodiments of the present pulsation attenuation apparatuses, systems, and methods may account for those reflected portions of waves when determining, e.g., pipe length and positioning of certain junctions. Other embodiments of the present pulsation attenuation systems, apparatuses, and methods may account for those reflected portions of waves propagating through natural gas pipelines.

Embodiments of the present pulsation attenuation apparatuses, systems, and methods including reciprocating compressors with multiple sources, such as multiple cylinders, may reduce the pressure wave propagating through the fluid when combined from the multiplicity of sources while employing other means to improve system performance.

Certain embodiments of the present apparatuses, systems, and methods for improved performance of a pressurized system attenuate pulsations in a conduit or duct. While sound wave propagation cancellation and pulse propagation cancellation may be based on some of the same principles, it should be recognized by one skilled in the art of wave dynamics that reduction of sound wave propagation has a different goal and operates differently from reduction of pulse propagation to improve performance of a pumping system.

Certain embodiments of the present apparatuses, systems, and methods for improved performance of a pressurized system may further preserve the integrity of piping and vessel systems subjected to pulsations.

Embodiments of the apparatuses, systems, and methods for improved performance of a pressurized system described herein reduce pulsations in pumping systems, including pumping systems utilizing reciprocating compressors and rotary pumps (collectively referred to herein as "pumps").

Embodiments of the present apparatuses, systems, and methods for improved performance of a pressurized system described herein reduce energy consumption as compared with existing systems.

Embodiments of the present apparatuses, systems, and methods for improved performance of a pressurized system described herein increase flow in pumping systems as compared to existing systems.

Embodiments of the present apparatuses, systems, and methods for improved performance of a pressurized system described herein reduce the pressure differential against which pumps operate as compared to existing systems.

Embodiments of the apparatuses, systems, and methods for improved performance of a pressurized system described herein may employ multiple means to reduce or cancel primary and harmonic frequencies of waves propagating through the pumped fluids, such as natural gas, and may improve system performance such as flow rate or efficiency.

SUMMARY OF THE INVENTION

Embodiments of apparatuses, systems, and methods for improved performance of a pressurized system are directed to systems, methods and apparatuses for reducing pressure waves in a fluid pumping system and to systems, methods and apparatuses for increasing flow or efficiency in a fluid pumping system.

In accordance with one embodiment of the present invention, a natural gas pumping system is provided. The natural gas pumping system includes a reciprocating compressor with two cylinders where each cylinder has an inlet through which natural gas is received and an outlet through which natural gas is discharged. The natural gas pumping system further includes a first conduit having a first end in fluid communication with the outlet of the first cylinder and a second end in fluid communication with a junction and a second conduit having a first end in fluid communication with the outlet of the second cylinder and a second end in fluid communication with the junction.

In accordance with another embodiment of the present invention, a natural gas pumping system that includes a reciprocating compressor is provided. The reciprocating compressor includes a first cylinder having an inlet through which natural gas is received and an outlet through which natural gas is discharged and a second cylinder having an inlet through which natural gas is received and an outlet through which natural gas is discharged. The natural gas compressor also includes a first conduit having a first end in fluid communication with the inlet of the first cylinder and a second end in fluid communication with a junction and a second conduit having a first end in fluid communication with the inlet of the second cylinder and a second end in fluid communication with the junction.

A pressure wave attenuation system is provided in another embodiment of the present invention. The pressure wave attenuation system includes one or more reciprocating compressors together comprising a first cylinder, a second cylinder, and a third cylinder, a first header coupled to the first cylinder and a first junction, a second header coupled to the second cylinder and the first junction such that a pressure wave propagating in the fluid flowing through the first header is out of phase with fluid flowing through the second header when the fluid flowing from the first and second headers combine at the first junction, a third header coupled to the third cylinder and a second junction; and a first branch line extending from the first junction to the second junction.

In yet another embodiment, a pressure wave attenuation system is provided that includes one or more reciprocating compressors together comprising a first cylinder, a second cylinder, a third cylinder, and a fourth cylinder; a first header in fluid communication with the first cylinder and a first junction; a second header in fluid communication with the second cylinder and the first junction such that a pressure wave propagating in the fluid flowing through the first header and a pressure wave propagating in the fluid flowing through the second header are attenuated when the fluid flowing from the first header and the fluid flowing through the second header combine at the first junction; a third header in fluid communication with the third cylinder and a second junction; a fourth header in fluid communication with the fourth cylinder and the second junction such that a pressure wave propagating in the fluid flowing through the third header and a pressure wave propagating in the fluid flowing through the fourth header are attenuated when the fluid flowing from the third header and the fluid flowing through the fourth header combine at the second junction; a first branch line in fluid communication with the first junction and a third junction; and a second branch line in fluid communication with the second junction and the third junction, the length of the second branch line differing from the length of the first branch line such that a pressure wave propagating in the fluid in the first branch line and a pressure wave propagating in the fluid in the second branch line are attenuated when the fluid flows from the first and second branch lines combine at the third junction.

In another embodiment, a method of reducing pressure variations in a natural gas pumping system is provided. That method includes combining natural gas flowing from a first reciprocating cylinder having a first periodic pressure fluctuation characteristic operating in a first phase with natural gas flowing from a second reciprocating cylinder having a second periodic pressure fluctuation characteristic operating in a second phase when the first periodic pressure fluctuation characteristic is out of phase with the second periodic pressure fluctuation characteristic.

The present invention also includes a method of attenuating pressure waves in a natural gas pumping system, comprising combining gas flowing from a first cylinder in which propagates a first periodic wave with gas flowing from a second cylinder in which propagates a second periodic wave such that the first periodic wave and the second periodic wave are out of phase.

Accordingly, the present invention provides solutions to the shortcomings of prior fluid pumping systems, apparatuses, and methods. Those of ordinary skill in the art will readily appreciate, therefore, that those and other details, features, and advantages of the present invention will become further apparent in the following detailed description of the preferred embodiments of the invention.

BRIEF DESCRIPTION OF THE DRAWINGS

The accompanying drawings, which are incorporated herein and constitute part of this specification, include one or more embodiments of the invention, and together with a general description given above and a detailed description given below, serve to disclose principles of embodiments of pulsation attenuation devices and networks.

DETAILED DESCRIPTION OF THE INVENTION

Reference will now be made to embodiments of apparatuses, systems, and methods for improved performance of a pressurized system, examples of which are illustrated in the accompanying drawings. Details, features, and advantages of those apparatuses, systems, and methods for improved performance of a pressurized system will become further apparent in the following detailed description of embodiments thereof. It is to be understood that the figures and descriptions included herein illustrate and describe elements that are of particular relevance to apparatuses, systems, and methods for improved performance of a pressurized system, while eliminating, for purposes of clarity, other elements found in typical fluid pumping systems.

Any reference in the specification to "one embodiment," "a certain embodiment," or any other reference to an embodiment is intended to indicate that a particular feature, structure or characteristic described in connection with the embodiment is included in at least one embodiment and may be utilized in other embodiments as well. Moreover, the appearances of such terms in various places in the specification are not necessarily all referring to the same embodiment. References to "or" are furthermore intended as inclusive so "or" may indicate one or another of the ored terms or more than one ored term.

Figure 1:
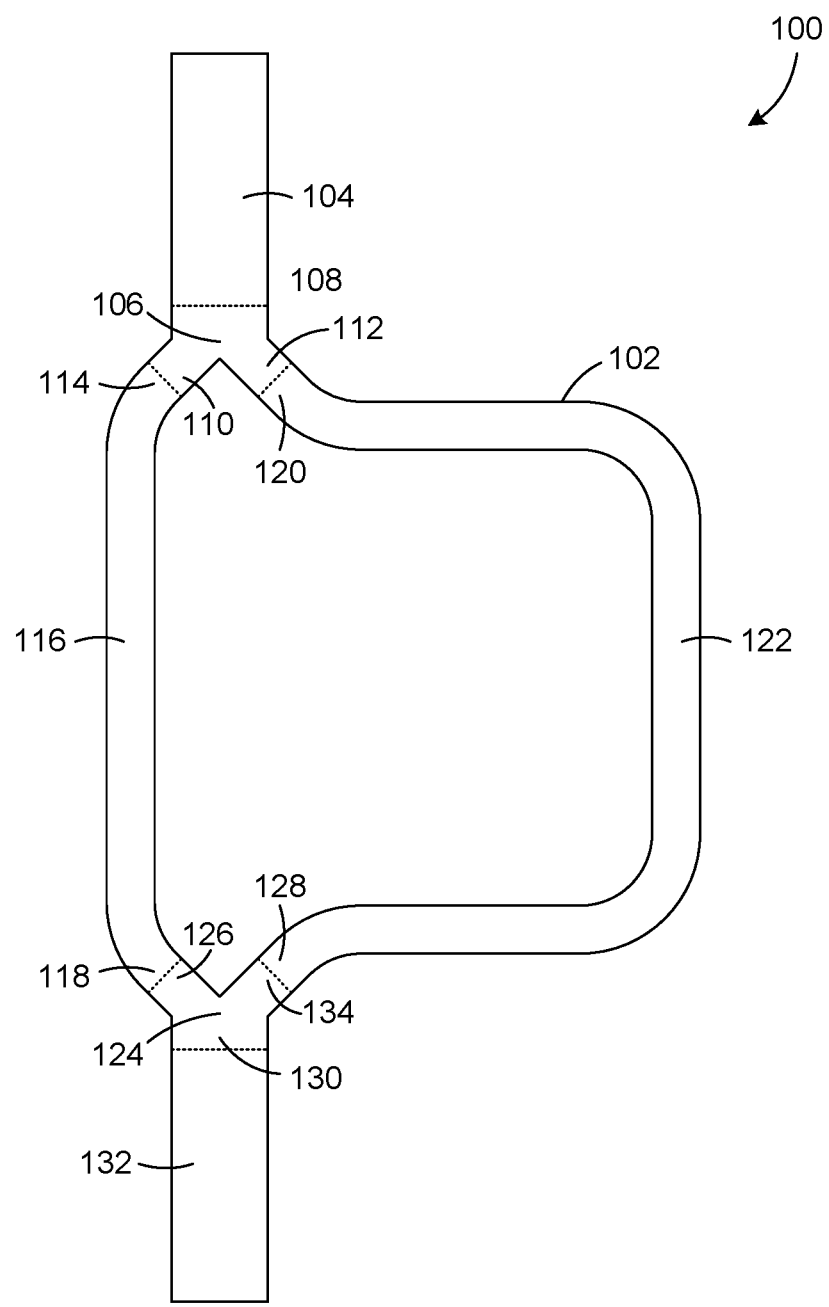
FIG. 1 illustrates an embodiment of a pulsation attenuation device.

FIG. 1 illustrates an embodiment of a pressure wave attenuation device 100, also referred to as a pulsation attenuation device, having one tuned loop 102. The tuned loop 102 includes an inlet conduit 104 coupled to an inlet junction 106. The inlet junction 106 has an inlet 108 coupled to the inlet conduit 104, a first outlet 110 and a second outlet 112. The first outlet 110 of the inlet junction 106 is coupled to a first end 114 of a first branch line 116, also referred to as a first attenuating conduit, and the second outlet 112 of the inlet junction 106 is coupled to a first end 120 of a second branch line 122, also referred to as a second attenuating conduit.

The inlet conduit 104 illustrated in FIG. 1 is a pipe having a length, an internal diameter, and an internal area. Similarly, the first branch line 116 and the second branch line 122 illustrated in FIG. 1 are pipes and each has a length, an internal diameter, and an internal area. Other conduits discussed herein may have various shapes (e.g., round or rectangular), but those conduits generally also have a length and an internal area. The dimensions (e.g., length and area) of those conduits (e.g., 104, 116, and 122) furthermore affect various aspects of system operation as discussed herein.

It should be noted that the term "junction" as used herein includes any connecting device to which three or more conduits may be coupled, including, for example, a wye-, a tee- or an x-shaped junction, or a junction formed on or with a conduit. In an embodiment, the inlet junction, outlet junction, first branch line, and second branch line are formed as a single entity. In another embodiment, the inlet junction, outlet junction, first branch line, and second branch line are formed of more than one component wherein at least one junction is formed with at least one branch line.

In certain embodiments, the branch lines and attenuating conduits 116 and 122 are formed straight, angled, curved, or otherwise to meet the desires or constraints of an application, such as to minimize the size of the pulsation attenuation device 100.

An outlet junction 124 includes a first inlet 126 coupled to a second end 118 of the first attenuating conduit 116 and a second inlet 134 coupled to a second end 128 of the second attenuating conduit 122. The outlet junction 124 also has an outlet 130, which may be coupled to an outlet conduit 132 as illustrated in the embodiment shown in FIG. 1.

The pulsation attenuation device 100 may carry a pressurized fluid, such as, for example, natural gas. The inlet conduit 104 may be arranged in fluid communication with a pump, such as for example the pump 450 illustrated in FIG. 4, pump 806 illustrated in FIG. 8, or pump 906 illustrated in FIG. 9, applying pressure to the fluid. The outlet conduit 132 may be in fluid communication with a system (not shown) to which the pressurized fluid is carried. Fluid communication with either the pump (e.g., 450, 806, 906) or the system may, for example, be accomplished by direct coupling or through additional conduits. The tuned loop 102 may attenuate pressure fluctuations, variations, or waves in a primary pressure wavelength propagated in the fluid and odd harmonics of that primary pressure wavelength.

The term "pressure wave" as used herein describes a periodic, repeating variation or fluctuation in pressure. The term "pulsation" as used herein refers to the difference between a highest pressure point or portion of the pressure wave and the lowest pressure point of portion in a periodic pressure wave. The term "peak pressure" generally refers to the higher pressure portion of the periodic pressure wave, but may also refer to the lower pressure portion of the periodic pressure wave. The pressure wave may repeat for any length of time. In a reciprocating compressor example, the pressure wave will generally repeat periodically at a frequency that is constant while the reciprocating compressor operates at a constant speed. When the speed of the reciprocating compressor changes, the frequency of the periodic pressure wave generally changes to a different frequency.

Regarding conduit sizes, the inlet conduit 104 and the outlet conduit 132 may have approximately the same cross-sectional area. The first attenuating conduit 116 may have approximately half the cross-sectional area of the inlet conduit 104 and the outlet conduit 132, and the second attenuating conduit 122 may have approximately half the cross-sectional area of the inlet conduit 104 and the outlet conduit 132. For example, where a fourteen inch, schedule 80, round, steel inlet conduit 104 and a fourteen inch, schedule 80, round, steel outlet conduit 132 having cross-sectional areas of 122.72 square inches are used, the first and second attenuating conduits 116 and 122 may be ten inch, schedule 80, round, steel conduits having cross-sectional areas of 71.84 square inches each.

Dividing fluid flow into different length conduits of appropriate lengths and areas, and then recombining those flows may reduce or cancel certain pressure waves emanating from a pump (such as pump 450, 806, or 906) thereby smoothing the pressure of the fluid flow leaving the pulsation attenuation device 100. For example, where one or more properly designed tuned loops 102, 802, 910, and 912 are located downstream of the discharge of a pump, such as pump 806 shown in FIG. 8 or pump 906 shown in FIG. 9, certain pressure waves in the fluid flowing downstream of the tuned loop 102, 802, 910, and 912 should be attenuated.

Figure 8:
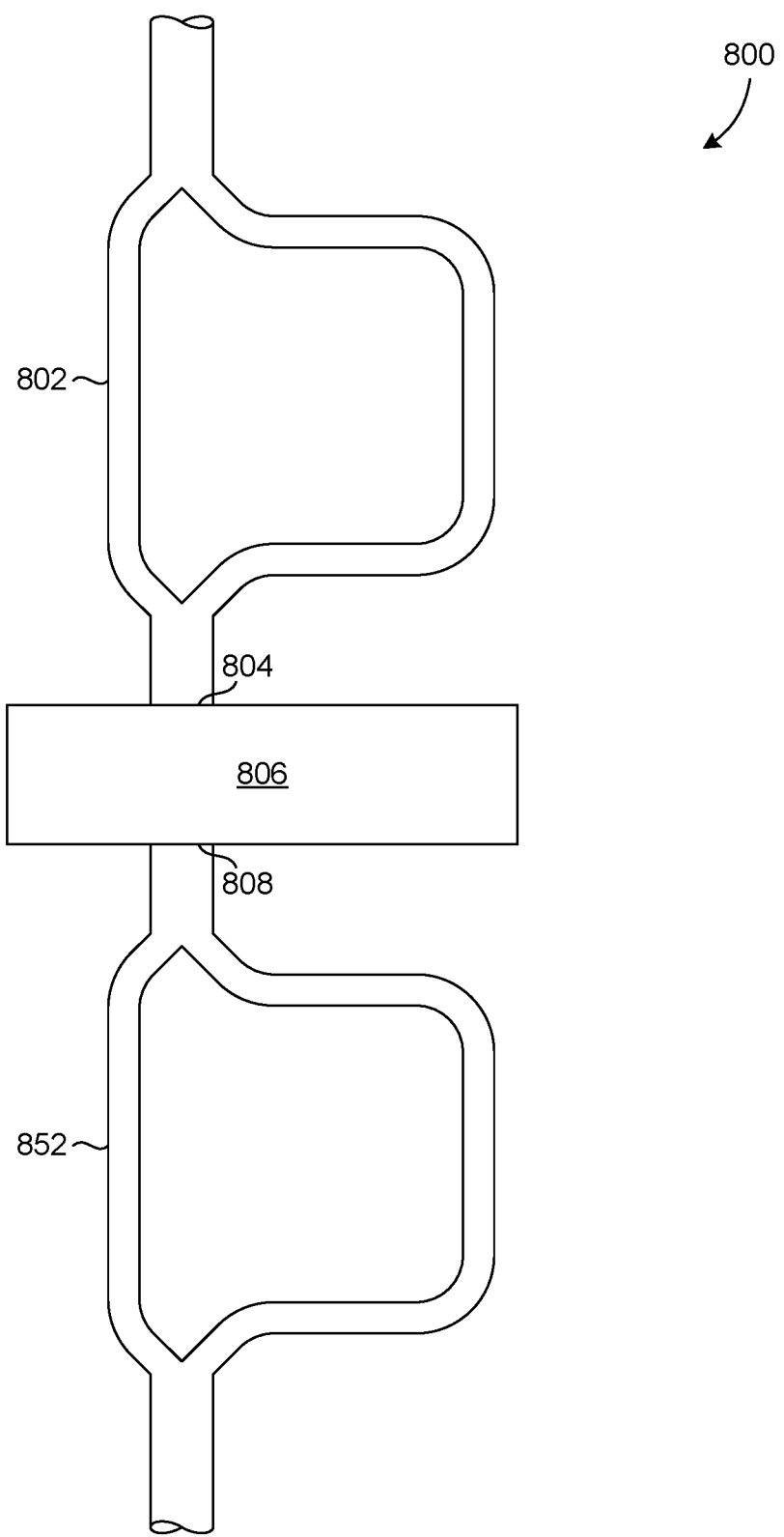
FIG. 8 illustrates an embodiment of a tuned loop network including two tuned loops respectively in fluid communication with the inlet and outlet of a pump.
Figure 9:
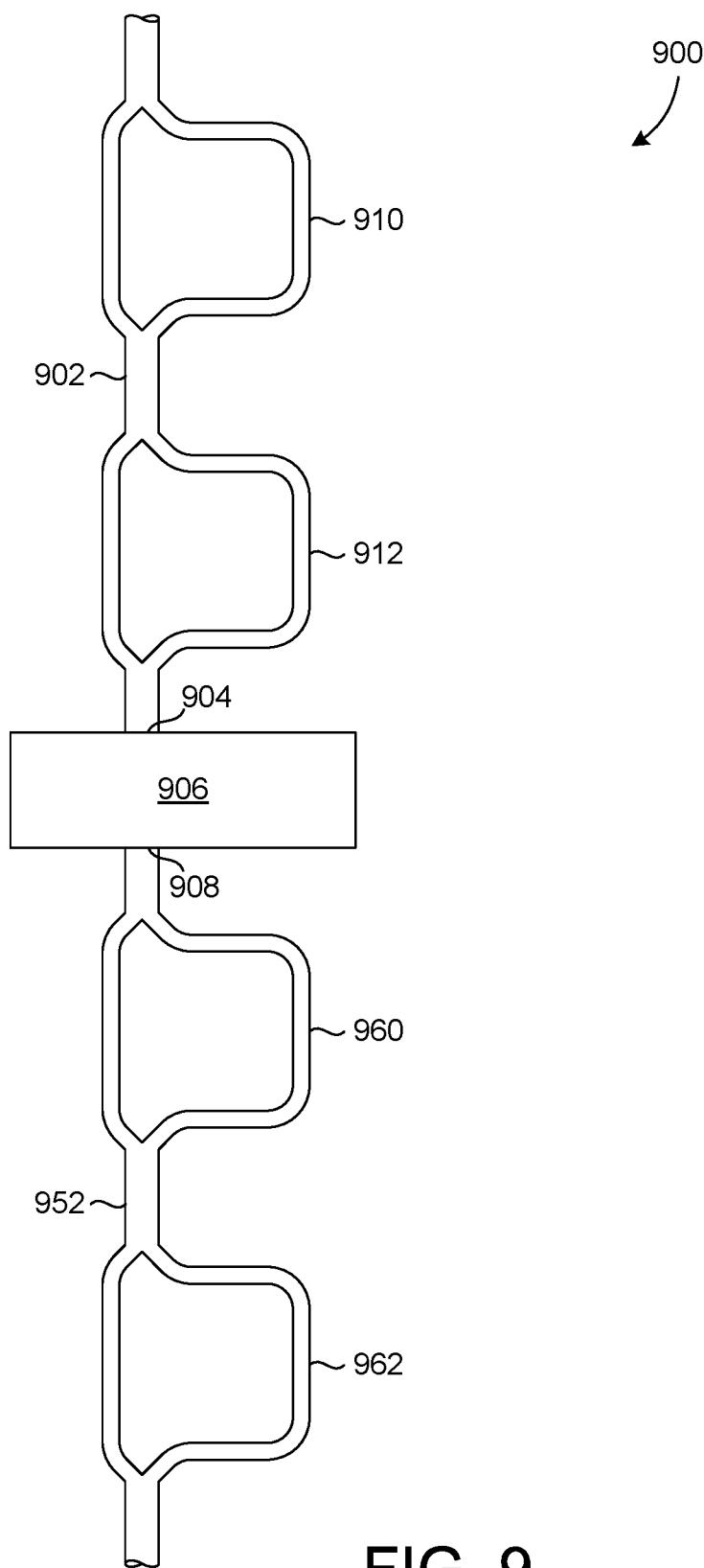
FIG. 9 illustrates an embodiment of a network including a suction tuned loop network and a discharge tuned loop network.

Locating a tuned loop 102 or an inlet junction 106 of a tuned loop 102 at an optimum location with respect to a pump (e.g., 450, 550, 694, 806, and 906) can partially reflect waves or pulsations so as to increase flow or increase pump (e.g., 450, 550, 694, 806, and 906) efficiency. For example, where a properly designed tuned loop 102 is located at an appropriate location downstream of a pump (e.g., 450, 550, 694, 806, and 906) waves partially reflected upstream may have a phase relationship with cylinder cycles (not shown in FIGS. 8 and 9) of the pump (e.g., 806 and 906) reducing pressure at the pump (e.g., 450, 550, 694, 806, and 906) cylinder outlets discharge (e.g., near the pump outlet 808 and 908 as shown in FIGS. 8 and 9). That phase relationship may determine, at least in part, the flow capacity and efficiency and can be varied by, for example, varying the lengths of the first branch 116 and second branch 122 of the tuned loop 102.

Thus, while previous fluid pumping systems dissipated a significant amount of energy by various apparatuses and methods including use of bottles and by muffling fluid flow, embodiments of pressure wave and pulsation attenuation cancel or reduce undesirable pressure waves and pulses, thereby dissipating less energy than muffling. Furthermore, embodiments of pressure wave and pulsation attenuation improve pump (e.g., 450, 806, and 906) efficiency or system flow capacity by addressing reflected waves at the cylinder outlets (e.g. 441, 442, 443, and 444 for pump 450, near the outlets 808 and 908 for pumps 806 and 906). Embodiments of pressure wave and pulsation attenuation may improve pressure conditions at a pump inlet (e.g., 804 and 904 as shown in FIGS. 8 and 9) as well.

The pulsation attenuation devices, networks, and methods described herein are based in part on the following principles:

1) Repeating pulses with frequency F and period P are made up of the sum of a series of sine waves with frequencies F, 2*F, 3*F, . . . periods P/1, P/2, P/3, . . . and amplitudes A1, A2, A3, . . . . These sine waves may be referred to as the primary frequency, F, the first harmonic frequency, 2*F, second harmonic frequency, 3*F, and so on. This infinite series of sine waves may be referred to as a Fourier series.

2) The sum of two sine waves of equal amplitude but 180 degrees out of phase is zero (i.e. the waves cancel each other [sin(X+180 deg)=−sin(X)]).

3) A pressure wave propagating down a pipe can be divided into two roughly equal parts with a Y branch.

4) If the two divided pressure waves travel different distances and are recombined at a later point, the different distances will time shift and may phase shift, the two pressure wave parts.

5) The time/phase shift caused by such a separation and recombination will cancel frequency components that have periods of 2, 6, 10, 14, . . . times the time shift if they are present in the repeating pressure wave.

6) The delay loop created by dividing pressure waves, causing the pressure waves to travel different distances, and recombining the pressure waves should also attenuate, that is partially cancel, frequencies components of the pulse in between the canceled frequencies except for the frequencies that are half way between two consecutive canceled frequencies.

7) The difference in length of two paths of different distances can be "tuned" to one or more frequencies present in a pressure wave to dramatically reduce the pressure waves in a conduit or duct.

8) If the lengths of the two paths are tuned to the speed at which a pump is running, the pressure waves will generally be substantially reduced without a significant pressure loss.

Figure 2:
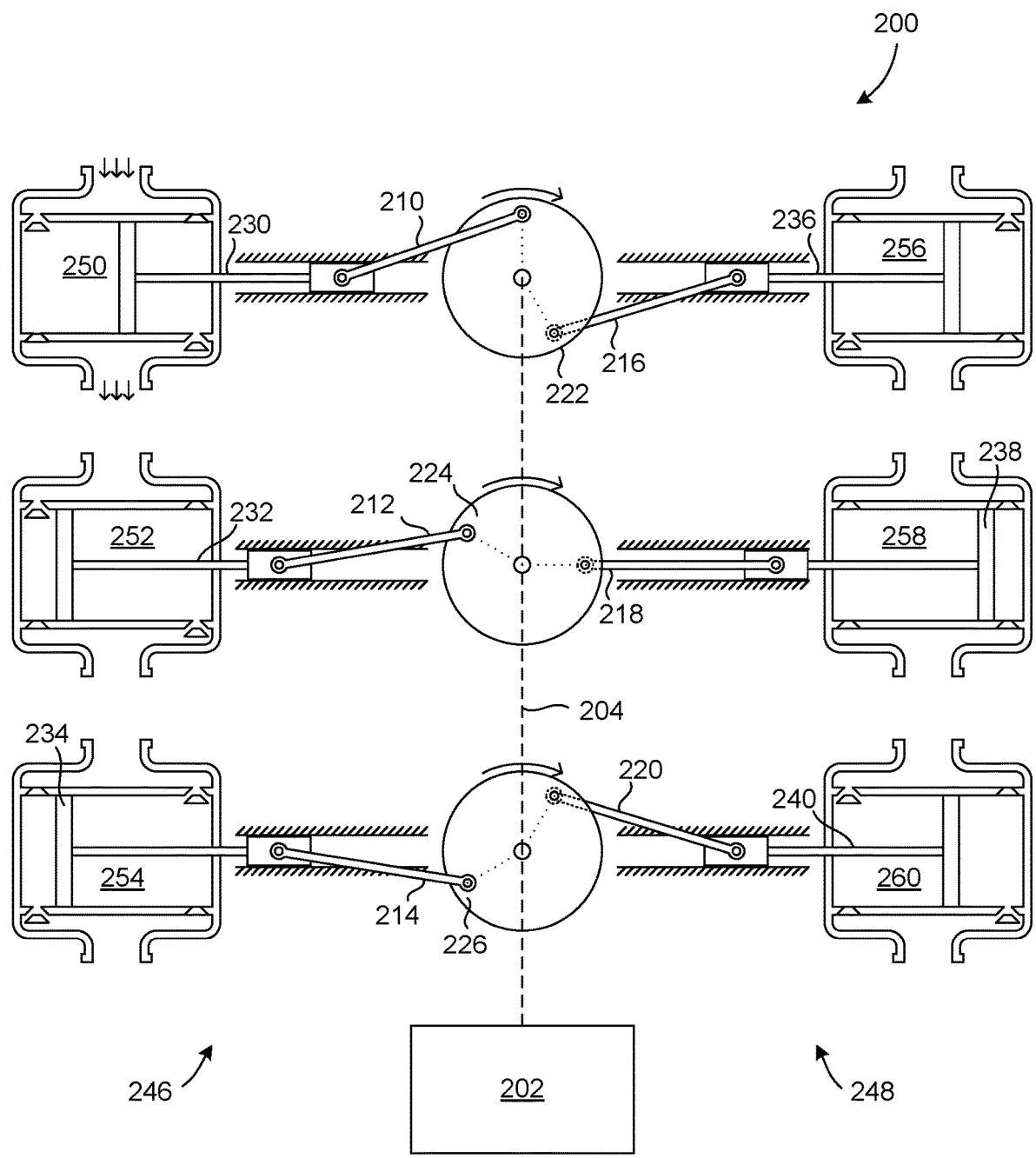
FIG. 2 illustrates a schematic diagram of an embodiment of a six cylinder reciprocating compressor type pump.

FIG. 2 illustrates a schematic diagram depicting a six cylinder reciprocating compressor 200 type pump. The reciprocating compressor 200 includes a motor 202 that turns a crankshaft 204. The reciprocating compressor 200 may be of any desired type, including an electrically powered or natural gas powered compressor 200.

The crankshaft 204 illustrated in FIG. 2 is coupled to a first connecting rod 210, a second connecting rod 212, a third connecting rod 214, a fourth connecting rod 216, a fifth connecting rod 218, and a sixth connecting rod 220. In various embodiments, the crankshaft 204 may be coupled to any number of connecting rods or other piston operating apparatuses.

The first connecting rod 210 is coupled to a first piston 230 in a first cylinder 250. The second connecting rod 212 is coupled to a second piston 232 in a second cylinder 252. The third connecting rod 214 is coupled to a third piston 234 in a third cylinder 254. The fourth connecting rod 216 is coupled to a fourth piston 236 in a fourth cylinder 256. The fifth connecting rod 218 is coupled to a fifth piston 238 in a fifth cylinder 258. The sixth connecting rod 220 is coupled to a sixth piston 240 in a sixth cylinder 260.

For simplicity, FIG. 2 shows a single simplified disc-like crank throw 222, 224, and 226 for each pair of opposed cylinders 250 and 256, 252 and 258, and 254 and 260. Alternatively, the crank shaft 204 may have an individual crank throw for each cylinder 250, 256, 252, 258, 254, and 260 or any other crankshaft 204 configuration desired.

The frequency of the reciprocating compressor 200 is the frequency at which the reciprocating compressor 200 applies its propelling force. For example, FIG. 2 illustrates a double acting reciprocating compressor 200 with double acting cylinders 250, 252, 254, 256, 258, and 260. The pistons 230, 232, 234, 236, 238, and 240 of those cylinders 250, 252, 254, 256, 258, and 260 propel fluid with each motion in both directions in a cylinder 250, 252, 254, 256, 258, and 260. Thus, the frequency of the pressure waves or pulsations for each of the cylinders 250, 252, 254, 256, 258, and 260 will be twice the frequency of the rotating speed of the compressor (one pulsation or high pressure peak for each motion of the cylinders 250, 252, 254, 256, 258, and 260 during each cycle of the motor 202).

A wavelength, for purposes of an embodiment, is the period of the pressure wave times the acoustic velocity of the fluid in which the pressure wave is propagating. Thus, in the embodiment of FIG. 2, wherein fluid is being pumped by the reciprocating compressor 200, the primary wavelength of a pressure wave for one cylinder 250, 252, 254, 256, 258, and 260 is the period from one fluid propelling motion of the cylinder 250, 252, 254, 256, 258, and 260 to the next fluid propelling motion of the cylinder 250, 252, 254, 256, 258, and 260 multiplied by the acoustic velocity of the fluid.

Pumps (e.g., 200, 450, 806, and 906) furthermore frequently operate at various speeds. The ratio of the fastest speed to the slowest speed of operation in pumping system embodiments may be a narrow, but significant range, such as a 25% turndown rate. Moreover, in a natural gas pumping station, the pump (e.g., 200, 450, 806, and 906) speed may vary to meet a varying demand on the gas pumping system. A primary wavelength may, therefore, be established for the pump (e.g., 200, 450, 806, and 906) at a selected speed. The primary wavelength, however, will vary when the speed of the pump (e.g., 200, 450, 806, and 906) is varied. Accordingly, embodiments of the present pressure wave attenuation apparatuses, systems, networks, and methods operate to minimize pressure waves created by the pump (e.g., 200, 450, 806, and 906) operating over a range of speeds.

Different speed and load conditions under which the pump (e.g., 200, 450, 806, and 906) operates may create different repeating pressure waves and different Fourier series. Embodiments of pulsation attenuation use one or more tuned loops or other systems, apparatuses, or methods described herein to effectively attenuate the critical frequencies present in the Fourier series that characterize the speed and load range of the pump (e.g., 200, 450, 806, and 906).

It should be recognized that, in embodiments, full cancellation may occur for sinusoidal pressure waves when the fluid stream carrying those sinusoidal pressure waves is divided into equal parts and recombined at 180 degrees out of phase. For sinusoidal pressure waves that are recombined at a relative phase shift of 360 degrees, effectively no cancellation may occur and for sinusoidal pressure waves that are recombined at other degrees out of phase, partial cancellation of those sinusoidal pressure waves may occur. A tuned loop 102, also referred to as a delay loop herein, and other flow combining systems, apparatuses, and methods described herein, may thus cancel a series of pressure wave frequency components propagating in a fluid (i.e., a primary frequency and its odd harmonics) and provide partial cancellation or attenuation of one or more ranges of pressure wave frequencies, while leaving certain pressure wave frequencies, such as even frequencies divisible by four, not effectively attenuated.

In certain embodiments where pressure wave attenuation is desired in a pumped fluid, it may be less necessary, or simply unnecessary, to attenuate higher harmonics. Higher harmonics tend to be lower amplitude in certain fluid flow applications and so those higher harmonics may not be as important to attenuate, or may create pressure waves that are not necessary to attenuate.

Referring again to FIG. 1, in pressure wave attenuation, a first tuned loop 102 or other flow combining system, apparatus, or method described herein may be selected to recombine waves at 180 degrees out of phase of a primary frequency in the range of operation of the pump (e.g., 200, 450, 806, and 906) to cancel or attenuate pressure waves at that frequency. It should be recognized that certain harmonics of that frequency will also be attenuated by that tuned loop 102 or the other flow combining systems, apparatuses, and methods described herein.

A second tuned loop 102 may be selected to recombine waves at 180 degrees out of phase of a different primary frequency in the range of operation of the pump (e.g., 200, 450, 806, and 906) to attenuate that frequency and certain harmonics of that frequency.

Because a selected number of tuned loops 102 tuned to primary frequencies in the pump (e.g., 200, 450, 806, and 906) operating range will cancel frequencies for which they are tuned and certain harmonics of those frequencies and will also attenuate frequencies near the tuned frequencies, a small number of tuned loops 102, in many cases from two to four tuned loops 102, may be sufficient to attenuate a range of primary frequencies that may be created by a pump that operates at varying speeds to a desired level.

Frequently in fluid pumping applications, the speed range of a pump (e.g., 200, 450, 806, and 906) may be significant enough to justify the use of two or three tuned loops 102 tuned to primary frequencies in the pump (e.g., 200, 450, 806, and 906) operating range, but not so large as to merit more than two or three tuned loops 102. A defined range of primary frequencies within which attenuation is desired may, therefore, be determined and a desired level of pressure wave attenuation for that range may be designed using a finite number of tuned loops 102.

Additional tuned loops 102 may be employed to cancel problematic or undesirable non-primary frequencies. Accordingly, networks of two, three, or four tuned loops 102 or networks that combine one or more tuned loops 102 with other flow combining systems, apparatuses, and methods described herein are believed to be effective to minimize a wide range of undesirable frequencies in a fluid pumping application. Furthermore, other pressure wave attenuation devices, such as bottles, and methods, such as those previously used or those developed in the future, may be used in combination with one or more tuned loops 102 to attenuate pressure waves.

Referring again to the embodiment illustrated in FIG. 2, the cycles of the three cylinders 250, 252, and 254 on the first side 246 of the reciprocating compressor 200 may be offset by 60 degrees (noting this figure depicts a double acting compressor configuration) one from another. The three cylinders 256, 258, and 260 on the second side 248 of the reciprocating compressor 200 may also be offset by 60 degrees (noting this figure depicts a double acting compressor configuration) one from another. In addition, the cylinders on the second side 248 may be offset from the cylinders on the first side 246 by 30 degrees such that pressure peaks or pulsations propagating from the second side 248 cylinders 256, 258, and 260 occur at or near a midpoint in time between pressure peaks or pulsations propagating from the first side 246 cylinders 250, 252, and 254. In that way, there can be twelve pressure peaks or pulsations leaving the reciprocating compressor 200 at equally spaced time intervals per rotation of the shaft 204. For example, the first cylinder 250 may reach peak discharge pressure on a first of its two strokes per cycle at 0 degrees of shaft 204 rotation, the fourth cylinder 256 may reach peak discharge pressure on a first of its two strokes per cycle at 30 degrees of shaft 204 rotation, the second cylinder 252 may reach peak discharge pressure on a first of its two strokes per cycle at 60 degrees of shaft 204 rotation, the fifth cylinder 258 may reach peak discharge pressure on a first of its two strokes per cycle at 90 degrees of shaft 204 rotation, the third cylinder 254 may reach peak discharge pressure on a first of its two strokes per cycle at 120 degrees of shaft 204 rotation, and the sixth cylinder 260 may reach peak discharge pressure on a first of its two strokes per cycle at 150 degrees of shaft 204 rotation. The first cylinder 250 may reach peak discharge pressure on a second of its two strokes per cycle at 180 degrees of shaft 204 rotation, the fourth cylinder 256 may reach peak discharge pressure on a second of its two strokes per cycle at 210 degrees of shaft 204 rotation, the second cylinder 252 may reach peak discharge pressure on a second of its two strokes per cycle at 240 degrees of shaft 204 rotation, the fifth cylinder 258 may reach peak discharge pressure on a second of its two strokes per cycle at 270 degrees of shaft 204 rotation, the third cylinder 254 may reach peak discharge pressure on a second of its two strokes per cycle at 300 degrees of shaft 204 rotation, and the sixth cylinder 260 may reach peak discharge pressure on a second of its two strokes per cycle at 330 degrees of shaft 204 rotation.

Figure 3:
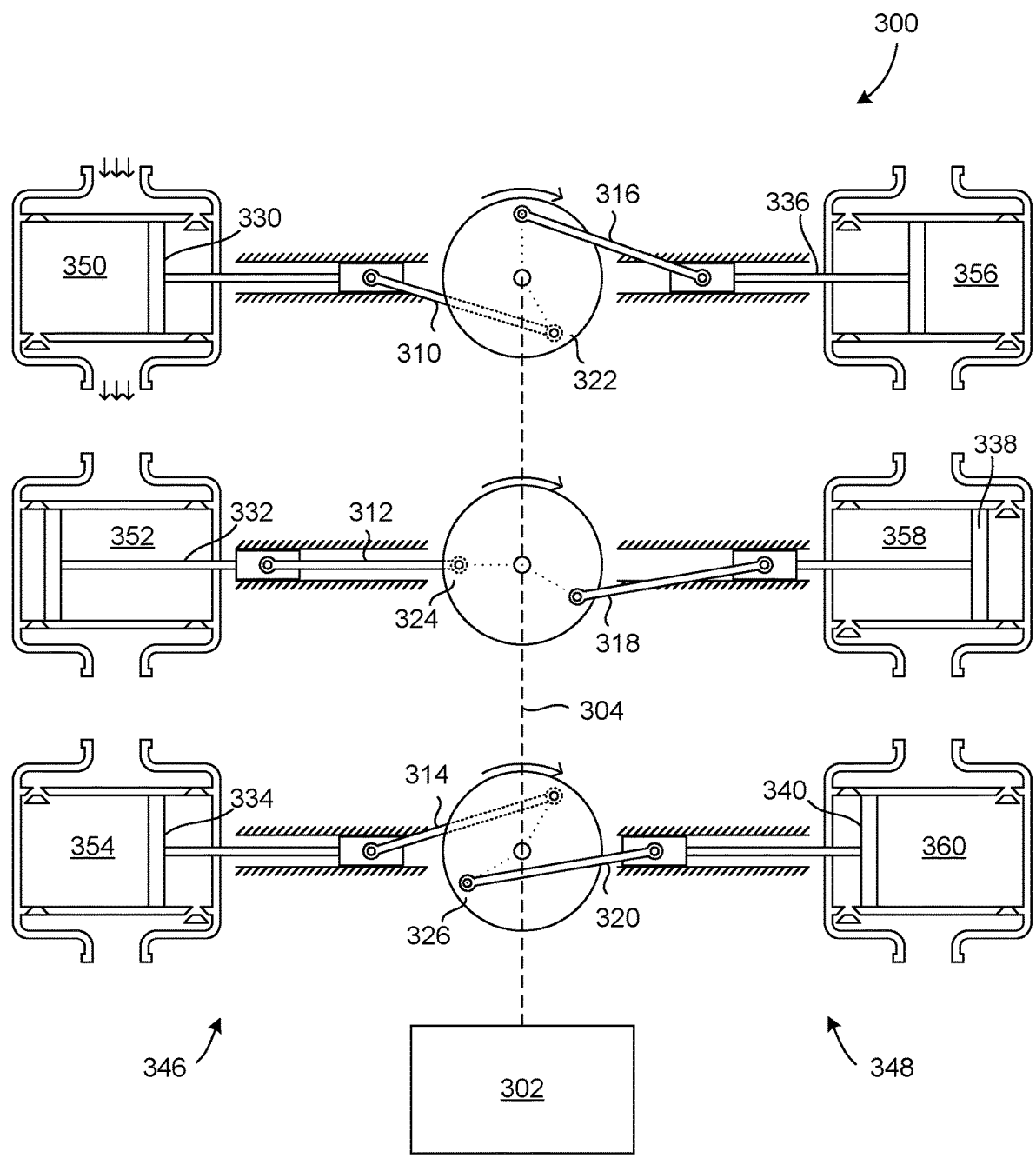
FIG. 3 illustrates a schematic diagram of an embodiment of a six cylinder reciprocating compressor type pump.

FIG. 3 illustrates a schematic diagram depicting another embodiment of a six cylinder reciprocating compressor 300 type pump having an offset cylinder operation. The compressor 300 includes a motor 302 that turns a crankshaft 304. The compressor 300 may be of any desired type, including an electrically powered or natural gas powered compressor 300.

The crankshaft 304 illustrated in FIG. 3 is coupled to a first connecting rod 310, a second connecting rod 312, a third connecting rod 314, a fourth connecting rod 316, a fifth connecting rod 318, and a sixth connecting rod 320. In various embodiments, the crankshaft 304 may be coupled to any number of connecting rods or other piston operating apparatuses.

The first connecting rod 310 is coupled to a first piston 330 in a first cylinder 350. The second connecting rod 312 is coupled to a second piston 332 in a second cylinder 352. The third connecting rod 314 is coupled to a third piston 334 in a third cylinder 354. The fourth connecting rod 316 is coupled to a fourth piston 336 in a fourth cylinder 356. The fifth connecting rod 318 is coupled to a fifth piston 338 in a fifth cylinder 358. The sixth connecting rod 320 is coupled to a sixth piston 340 in a sixth cylinder 360.

For simplicity, FIG. 3 shows a single simplified disc-like crank throw 322, 324, and 326 for each pair of opposed cylinders 350 and 356, 352 and 358, 354 and 360. Alternatively, the crank shaft 304 may have an individual crank throw for each cylinder 350, 356, 352, 358, 354, and 360 or any other crankshaft 304 configuration desired.

The reciprocating compressor 300 embodiment illustrated in FIG. 3 may provide better balanced inertia than the reciprocating compressor 200 illustrated in FIG. 3 and other arrangements may be used that further improve inertial balance. Any arrangement of cylinders may be used to meet any number of constraints or consideration. Moreover, the reciprocating compressors 200 and 300 illustrate only certain components of a reciprocating compressor and additional components may be used as desired. For example, counterweights may be used to balance the rotational momentum of a reciprocating compressor (e.g., 200 or 300).

The cycles of the three cylinders 350, 352, and 354 on the first side 346 of the reciprocating compressor 300 may be offset by 120 degrees (noting this figure depicts a double acting compressor configuration) one from another. The three cylinders 356, 358, and 360 on the second side 348 of the pump 300 may also be offset by 120 degrees (noting this figure depicts a double acting compressor configuration) one from another. In addition, the cylinders on the second side 348 may be offset from the cylinders on the first side 346 by 30 degrees such that pressure peaks or pulsations propagating from the second side 348 cylinders 356, 358, and 360 occur at or near a midpoint in time between pressure peaks or pulsations propagating from the first side 346 cylinders 350, 352, and 354. In that way, there can be twelve pressure peaks or pulsations leaving the reciprocating compressor 300 at equally spaced time intervals per rotation of the shaft 304. For example, the fourth cylinder 356 may reach a peak discharge pressure on its stroke away from the crankshaft 304 at 0 degrees of shaft 304 rotation, the first cylinder 358 may reach a peak discharge pressure on its stroke away from the crankshaft 304 at 30 degrees of shaft 304 rotation, the fifth cylinder 358 may reach peak discharge pressure on its stroke toward the crankshaft 304 at 60 degrees of shaft 304 rotation, the second cylinder 352 may reach peak discharge pressure on its stroke toward the crankshaft 304 at 90 degrees of shaft 304 rotation, the sixth cylinder 360 may reach peak discharge pressure on its stroke away from the crankshaft 304 at 120 degrees of shaft 304 rotation, and the third cylinder 354 may reach peak discharge pressure on its stroke away from the crankshaft 304 at 150 degrees of shaft 304 rotation. The fourth cylinder 350 may reach peak discharge pressure on its stroke toward the crankshaft at 180 degrees of shaft 304 rotation, the first cylinder 350 may reach peak discharge pressure on its stroke toward the crankshaft 304 at 210 degrees of shaft 304 rotation, the fifth cylinder 358 may reach peak discharge pressure on its stroke away from the crankshaft 304 at 240 degrees of shaft 304 rotation, the second cylinder 252 may reach peak discharge pressure on its stroke away from at 270 degrees of shaft 304 rotation, the sixth cylinder 360 may reach peak discharge pressure on its stroke toward at 300 degrees of shaft 304 rotation, and the third cylinder 354 may reach peak discharge pressure on its stroke toward the crankshaft 304 at 330 degrees of shaft 304 rotation.

Figure 4:
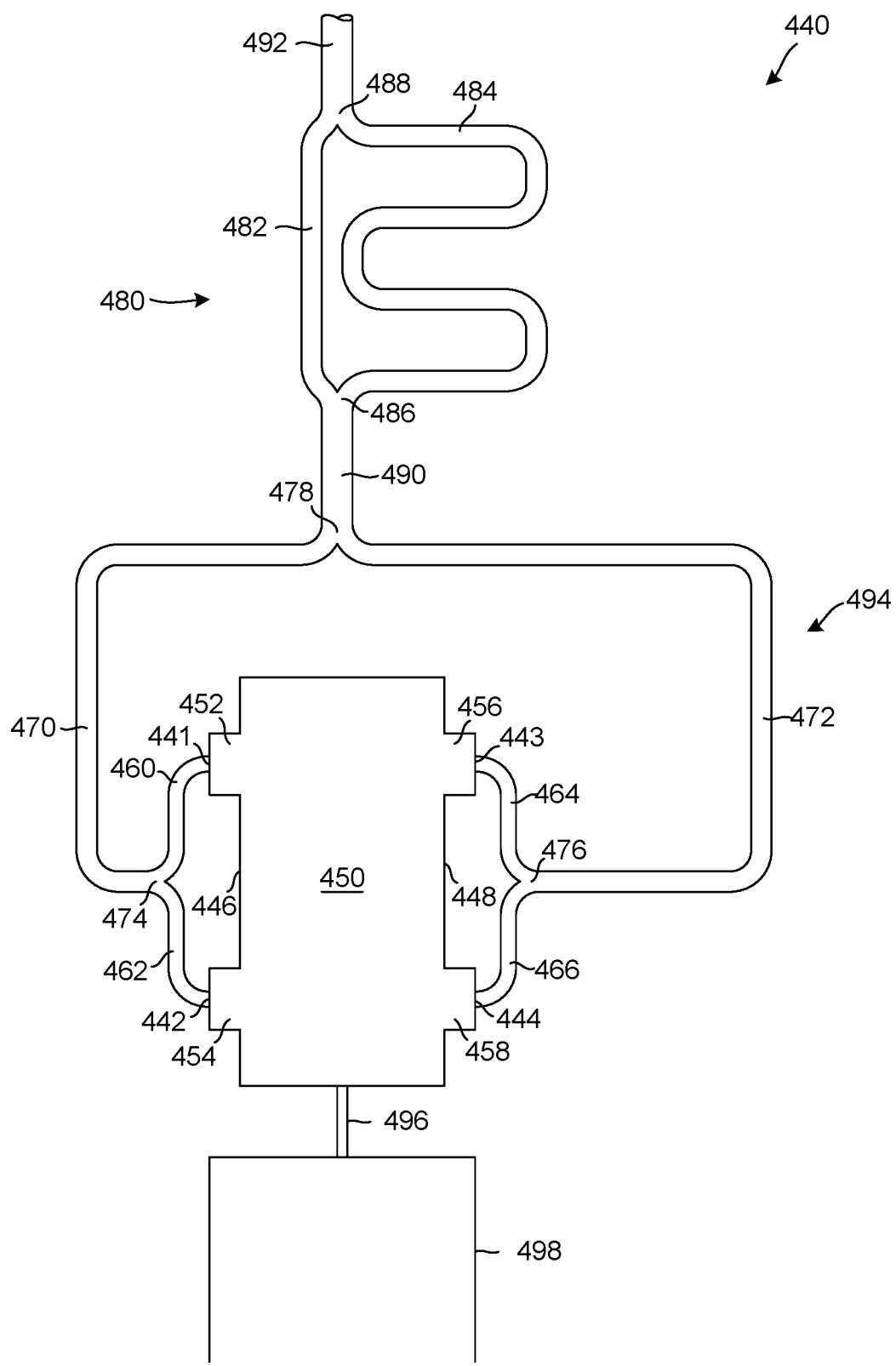
FIG. 4 illustrates an embodiment of a fluid pumping system.

FIG. 4 illustrates an embodiment of an outlet or discharge fluid piping system 440. The piping system includes a reciprocating pump 450, a flow combination system 494, and a tuned loop 480. The reciprocating pump 450 includes four cylinders 452, 454, 456, and 458, having outlets 441, 442, 443, and 444 respectively. A first header 460 carries fluid flowing from the first outlet 441 to a first side junction 474 and a second header 462 carries fluid flowing from the second outlet 442 to the first side junction 474. A third header 464 carries fluid flowing from the third outlet 443 to a second side junction 476 and a fourth header 466 carries fluid flowing from the fourth outlet 444 to the second side junction 476. The first header 460 and second header 462 are attached to a first branch line 470 at a first side junction 474 and the third header 464 and fourth header 466 are attached to a second branch line 472 at a second side junction 476. The first inlet branch line 470 and second inlet branch line 472 are attached to an inlet of the tuned loop 480 at a branch junction 478.

A connecting conduit 490 leads from the branch junction 478 to an inlet of a tuned loop inlet junction 486. The tuned loop inlet junction 486 also has two outlets, the first outlet being attached to a first end a first attenuating conduit 482 of the tuned loop 480 and the second outlet being attached to a first end of a second attenuating conduit 484 of the tuned loop 480. A second end of the first attenuating conduit 482 is attached to a first inlet of a tuned loop outlet junction 488 and a second end of the second attenuating conduit 482 is attached to a second inlet of the tuned loop outlet junction 488. An outlet of the tuned loop outlet junction is attached to a discharge conduit 492.

In an embodiment of the reciprocating pump system 440 the reciprocating pump 450 includes four double-acting cylinders 452, 454, 456, and 458. Each double-acting cylinder 452, 454, 456, and 458 causes fluid to flow twice during each rotation of a shaft 496 turned by a motor 498 and driving the reciprocating pump 450, thus creating pressure variations in the form of waves in the fluid propagating through the flow combination system 494 and the tuned loop 480 at twice the frequency of the shaft 496 rotation. In one embodiment, pairs of those cylinders 452 and 456, 454 and 458 create flow simultaneously (one on the upstroke and the other on the down-stroke) and the pairs of cylinders 452 and 454, 456 and 458 operate at 90 .degree. out of phase. In such an arrangement, the outlets 441 and 442 of two cylinders 452 and 454 operating at 90 .degree. of shaft 496 rotation out of phase (and creating fluid pressure waves which, at twice the shaft 496 rotation frequency, are 180 .degree. out of phase) are coupled using short, equal length header pipes 460 and 462 to quickly interleave the primary wavelength pressure waves existing in the fluid flow created by those cylinders 452 and 454. The outlets 443 and 444 of the other two cylinders 456 and 458 operating at 90 .degree. out of phase are similarly coupled using short, equal length header pipes 464 and 466 to quickly interleave the primary wavelength pressure wave existing in the fluid flow created by those cylinders 456 and 458.

In the embodiment illustrated in FIG. 4, cylinders, 452 and 454, contain double acting pistons which produce pressure waves that have two peaks 180 .degree. apart for every complete rotation of the crankshaft. The troughs on the pump crankshaft for cylinders 452 and 454 are offset by 90 crank angle degrees. The first header 460, carrying the fluid flow and pressure wave from the first cylinder 452, and the second header 462, carrying the fluid flow pressure wave from the second cylinder 454, are of equal length and join at a first side junction 474. In that way, the flows and pressure waves of the first cylinder 452 and second cylinder 454 are combined at 90 .degree. out of phase, thus interleaving, and significantly attenuating, pressure waves propagating from the first and second cylinders 452 and 454 and through the first and second headers 460 and 462 as the flow and pressure waves proceed down stream of junction 474 in conduit 470.

Pressure waves emanating from the third cylinder 456 and the fourth cylinder 458 on a second side 448 of the pump 450 are also 180 .degree. out of phase. The third header 464, carrying fluid flow from the third cylinder 456, and the fourth header 466, carrying fluid flow from the fourth cylinder 458, are of equal length and the flows through those headers 464 and 466 join at a second side junction 476. In that way, the flows of the third cylinder 456 and fourth cylinder 458 are combined at 180 .degree. out of phase, thus interleaving, and thereby cancelling or at least significantly attenuating, pressure waves flowing from the third and fourth cylinders 456 and 458 and through the third and fourth headers 464 and 466.

In the embodiment illustrated in FIG. 4, pistons in the first cylinder 452 and the third cylinder 456 operate in phase and pistons in the second cylinder 454 and the fourth cylinder 458 operate in phase such that pressures at the outlets 441 and 443 of the first and third cylinders 452 and 456 follow similar cycles and pressures at the discharges 442 and 444 of the second and fourth cylinders 454 and 458 follow similar cycles.

In another embodiment, the cycles of the first cylinder 452 and the third cylinder 456 are offset 45 degrees of shaft 496 rotation from one another and the cycles of the second cylinder 454 and the fourth cylinder 458 are offset 45 degrees of shaft 496 rotation from one another. In that way, pressure peaks from the first cylinder 452 to the second cylinder 454 are offset by 90 degrees of shaft rotation, which corresponds to a 180 degree wave phase offset, such that peak high pressure from the first cylinder 452 coincides with low pressure from the second cylinder 454. Pressure peaks from the second cylinder 454 to the third cylinder 456 are also offset by 90 degrees of shaft rotation and 180 degrees of wave phase such that peak high pressure from the second cylinder 454 coincides with low pressure from the third cylinder 456. Pressure peaks from the third cylinder 456 to the fourth cylinder 458 are also offset by 90 degrees of shaft rotation and 180 degrees of wave phase such that peak high pressure from the third cylinder 456 coincides with low pressure from the fourth cylinder 458. Pressure peaks from the fourth cylinder 458 to the first cylinder 452 are also offset by 90 degrees of shaft rotation and 180 degrees of wave phase such that peak high pressure from the fourth cylinder 458 coincides with low pressure from the first cylinder 452.

In an embodiment headers leading from the first cylinder 452, second cylinder 454, third cylinder 456, and fourth cylinder 458 may be combined directly, for example at the first side junction 474 by equal length headers 460, 462, 464, and 466 in certain embodiments, or in another way designed to attenuate pressure waves in the fluid flowing through those headers 460, 462, 464, and 466 and the second side junction 476 may not be used.

A first branch line 470 extends from the first side junction 474 where the first header 460 from the first cylinder 452 is coupled to the second header 462 from the second cylinder 454. A second branch line 472 extends from the second side junction 476 where the third header 464 from the third cylinder 456 is coupled to the fourth header 466 from the fourth cylinder 458. Those first and second branch lines 472 and 474 are further coupled at a branch line junction 478.

The lengths of the first branch line 470 and second branch line 472 are arranged such that the fluid flow in the first branch line 470 is coupled to the fluid flow from the second branch line 472 at the branch line junction 478 at 45 .degree. out of phase for a desired frequency.

Thus, the lengths of branch line 470 and branch line 472 in that embodiment are different. Moreover, the difference in the lengths of branch lines 470 and 472 is arranged so that a pulsation frequency experienced in the fluid flowing through the first branch line 470 and/or the second branch line 472 is interleaved and attenuated at the branch line junction 474.

Another consideration in determining the length of headers 460, 462, 464, and 466 and branch lines 470 and 472 is the effect of pressure waves traveling upstream to one or more cylinders 452, 454, 456, and 458. Wave peaks may, for example, be created when a piston is moving toward or when a piston reaches either end of a cylinder (for example cylinder 452) in a double-acting cylinder. Those wave peaks may affect the operation of one or more other cylinders (for example, cylinders 454, 456, or 458) as they propagate through the piping system 440 and reach those cylinders (for example, cylinders 454, 456, or 458). It should be recognized that each cylinder 452, 454, 456, and 458 will create pressure waves that may include pulses or wave peaks when they operate and those pressure waves will affect the other operating cylinders 452, 454, 456, and 458. Those pressure waves, furthermore, move along the piping system 440 at a regular frequency when the cylinders 452, 454, 456, and 458 operate at a constant speed. Thus, the time between wave peaks can be determined for a cylinder 452, 454, 456, and 458 operating at a constant speed, the time it takes for pressure waves to move along a length of pipe may be determined, and the times and regularity at which pressure peaks will arrive at a cylinder 452, 454, 456, and 458 can be determined.

Accordingly, header 460, 462, 464, and 466 and/or branch line 470 and 472 length can affect the efficiency at which the cylinders 452, 454, 456, and 458 operate and header 460, 462, 464, and 466 and/or branch line 470 and 472 length can be selected to optimize efficiency or other operating conditions existing at cylinders 452, 454, 456, and 458.

Pressure waves created by operation of the cylinders 452, 454, 456, and 458 propagate upstream and downstream in the headers 460, 462, 464, and 466 and branch lines 470 and 472 illustrated in FIG. 4. Accordingly, pressure waves from the first cylinder 452 partially impinge or come into contact with other cylinders 454, 456, and 458 in the piping system 440 and can affect the operation of those cylinders 454, 456, and 458. Likewise, pulse waves emanating from the other cylinders 454, 456, and 458 will partially impinge or come into contact with other cylinders 452, 454, 456, and 458 connected to the piping system 440 and can affect the operation of those cylinders 452, 454, 456, and 458.

For example, pressure waves created by the motion of a piston (e.g., 230 in FIG. 2) in the first cylinder 452 may propagate along the first header 460 and at least partially upstream along the second header 462 to the second cylinder 454. Those pressure waves may also propagate at least partially through the first side junction 474, along first branch line 470, through the branch line junction 478, upstream along the second branch line 472, through the second side junction 476 and along both the third header 464 and the fourth header 466 to contact or impinge upon the third cylinder 456 and the fourth cylinder 458.

Thus, in an embodiment, first and second headers 460 and 462 can have lengths selected to optimize the effect on the second cylinder 454 from pulses or pressure waves propagating from the first cylinder 452 and to optimize the effect on the first cylinder 452 from pulses or pressure waves propagating from the second cylinder 454. Similarly, the third and fourth headers 464 and 466 can have lengths selected to optimize the effect on the fourth cylinder 458 from pulses or pressure waves propagating from the third cylinder 456 and to optimize the effect on the third cylinder 456 from pulses or pressure waves propagating from the fourth cylinder 458.

The lengths of the first and second headers 460 and 462 can be maintained equal in an embodiment, while the total length of the first and second headers 460 and 462 combined is determined to optimize the effect of the pressure waves propagating from the first cylinder 452 on the second cylinder 454 and to optimize the effect of the pressure waves propagating from the second cylinder 454 on the first cylinder 452.

Similarly, the lengths of the third and fourth headers 464 and 466 can be maintained equal in that embodiment, while the total length of the third and fourth headers 464 and 466 combined is determined to optimize or reduce the effect of the pressure waves propagating from the third cylinder 456 on the fourth cylinder 458 and to optimize the effect of the pressure waves propagating from the fourth cylinder 458 on the third cylinder 456.

Thus, the length of each of the first and second branch lines 470 and 472 may be determined to attenuate pressure waves or pulsations propagating through those lines 470 and 472 by combining the flow passing through those lines 470 and 472 at branch line junction 478 when the flows passing through those lines will cancel or attenuate undesired pressure waves or pulsations. Alternately or in addition, the lengths of branch lines 470 and 472 may be arranged to optimize the effect of pulse waves propagating from the first side junction 474 at least partially to the third and fourth cylinders 456 and 458 and to optimize the effect of pulse waves propagating from the second side junction 476 at least partially to the first and second cylinders 452 and 454.

In a system where first, second, third, and fourth cylinders 452, 454, 456, and 458 are driven by a common shaft 496 and motor 498, as is depicted in FIG. 4, and where opposing cylinders, such as the first cylinder 452 and third cylinder 456 (and the second cylinder 454 and fourth cylinder 458) are operating in phase (the pistons in the in phase cylinders 452 and 456, 454 and 458 reach one of the two ends of their strokes simultaneously or nearly simultaneously), the total branch line length (length of the first branch line 470 plus length of the second branch line 472 and, possibly, plus a length associated with the branch line junction 478) may be selected to optimize the effect of pulse waves on both the cylinders on the first side 446 and second side 448 of the pump 450.

For example, the combined length of the first header 460, the first branch line 470, the second branch line 472 and the third header 464 (plus junctions 474, 478, and 476 if applicable) may be selected such that pulsations or undesirable portions of a pressure wave emanating or propagating from the first cylinder 452 arrive at the third cylinder 456 at a time in the third cylinder 456 cycle when those pulsations or undesirable portions of a pressure wave have a less detrimental effect on the operation of the third cylinder 456. The combined length of the first header 460, the first branch line 470, the second branch line 472 and the fourth header 466 may also be selected to minimize or reduce any detrimental effect of the operation of the first cylinder 452 on the fourth cylinder 458.

Because the cycles of the third and fourth cylinders 456 and 458 may be offset one from the other and the lengths of the third and fourth headers 464 and 466 may be equal or otherwise arranged such that it is not practical or possible to have pulsations or undesirable portions of a pressure wave arrive at both the third and fourth cylinders 456 and 458 at an optimal time, a compromise in combined line (e.g., 460, 470, 472, 464, or 460, 470, 472, 466, or 462, 470, 472, 464, or 462, 470, 472, 466) length may be made such that combined operation of the third and fourth cylinders 456 and 458 is improved or optimized, rather than optimization of one or the other cylinder 456 and 458. Thus, for example, where the pressure waves of the third cylinder 456 are offset from the pressure waves of the fourth cylinder 458 by 90 degrees of shaft rotation and the third header 464 and the fourth header 466 are of equal length, the combined lengths of the lines 460, 470, 472, 464, and 460, 470, 472, 466 leading from the first cylinder 452 to the third and fourth cylinders 456 and 458 may be arranged such that pulsations or undesirable portions of a pressure wave emanating from the first cylinder 452 arrive at the third and fourth cylinders 456 and 458 at mid-cycle for both the third and fourth cylinders 456 and 458 or another desirable time in the cycles of the third and fourth cylinders 456 and 458.

Because the cycles of the first and second cylinders 452 and 454 may be offset one from the other and the lengths of the first and second headers 460 and 462 may be equal or otherwise arranged such that it is not practical or possible to have pulsations or undesirable portions of a pressure wave emanating or propagating from the first and second cylinders 452 and 454 arrive at the third or fourth cylinders 456 and 458 at an optimal time, a compromise in combined line 460, 470, 472, 464, or 460, 470, 472, 466, or 462, 470, 472, 464, or 462, 470, 472, 466 length may be made such that combined operation of the cylinders 452, 454, 456 and 458 is improved or optimized, rather than optimization of any subset of those cylinders 452, 454, 456 and 458. Thus, for example, where the pressure waves of the first cylinder 452 are offset from the pressure waves of the second cylinder 454 by 90 degrees of shaft rotation the pressure waves of the third cylinder 456 are offset from the pressure waves of the fourth cylinder 458 by 90 degrees, the first header 460 and the second header 462 are of equal length and the third header 464 and the fourth header 466 are of equal length, the combined lengths of the lines leading from one cylinder (e.g., 452, 454, 456, or 458) to one or more other cylinders (e.g., 452, 454, 456, or 458) may be arranged such that pulsations or undesirable portions of a pressure waves emanating from each cylinder (e.g., 452, 454, 456, or 458) arrive at each other cylinder (e.g., 452, 454, 456, or 458) at a desirable time in the cycles of those other cylinders (e.g., 452, 454, 456, or 458).

In one embodiment of the outlet (discharge) piping system 440, the length of the first and second headers 460 and 462 is selected such that a low pressure point of a wave created by a piston (e.g., 230 in FIG. 2) in the first cylinder 452 moves along the first header 460, the first side junction 474, and the second header 462 and arrives at the second cylinder 454 at a time when a piston in the second cylinder 454 is at or near an end of its stroke (i.e. either end for a double-acting piston) and thus near either end of the cylinder and thus not near the center of its stroke. Such an arrangement may increase gas flow capacity. In another embodiment, the lengths of the first and second headers 460 and 462 may be selected such that a low pressure point of a wave created by a piston (e.g., 230 in FIG. 2) in the first cylinder 452 moves along the first header 460, the first side junction 474, and the second header 462 and arrives at the second cylinder 454 at a time when a piston in the second cylinder 454 is at or near the middle of its stroke (in a double-acting piston). Such an arrangement may improve compressor efficiency.

Note that in an embodiment in which the piston is a single-acting piston in an outlet or discharge piping system 440, the above regarding a double-acting cylinder may apply, except that for increased gas flow capacity, the low pressure point of the wave may arrive at the second cylinder 454 when the piston in the second cylinder 454 is at or near the end of its stroke, and thus the end of the second cylinder 454 where the piston is finishing or has just finished expelling gas from the second cylinder 454. For increased efficiency, the above regarding a double-acting cylinder may apply, except that the low pressure point of the wave may arrive at the second cylinder 454 when the piston in the second cylinder 454 is at or near the middle of its stroke moving in a direction in which it is pushing gas out of the second cylinder 454.

As used herein in relation to a piston stroke on the outlet or discharge side of a piping system, "at or near an end" or a similar term regarding a piston stroke refers to (for a double-acting piston) a position of the piston closer to either end of the cylinder than the middle of the cylinder, and refers to (for a single-acting piston) a position of the piston closer to the end of the cylinder where the piston is finishing or has just finished expelling gas. That term or a similar term thus encompasses both a single-acting and double-acting cylinder and piston unless otherwise specified.

As used herein in relation to a piston stroke on the outlet or discharge side of a piping system, "at or near the middle" or a similar term regarding a piston stroke refers to (for a double-acting piston) a position of the piston closer to the middle of the cylinder than either end of the cylinder, and refers to (for a single-acting piston) a position of the piston closer to the middle of the cylinder when the piston is moving in a direction in which it is pushing gas out of the cylinder. That term or a similar term thus encompasses both a single-acting and double-acting cylinder and piston unless otherwise specified.

It may be recognized that pressure waves and pulses may propagate along all the pipes 460, 462, 464, 466, 470, 472, 482, 484, 490, and 492 in the system 440 and to all apparatuses connected to the piping system 440 including any cylinders of additional pumps (not shown) that are connected to the piping system 440. The lengths of the headers 460, 462, 464, and 466 and various pipes 470, 472, 482, 484, 490, and 492 may, therefore, be selected such that pressure waves or pulses passing through the piping system 440 arrive at cylinders 452, 454, 456, and 458 and any other cylinders present in the piping system 440 at times that are beneficial or at least minimally detrimental to operation of the cylinders 452, 454, 456, and 458 and any other cylinders present in the piping system 440. Such an arrangement may improve efficiency, fluid flow, power consumption, or other operational aspects of cylinders (such as cylinders 454, 456, or 458) based on pulse waves propagating from another cylinder (such as cylinder 452). The lengths of the headers 460, 462, 464, and 466 and various pipes 470, 472, 482, 484, 490, and 492 may, therefore, be selected such that pressure waves and pulses passing through the piping system 440 arrive at any selected portion of the piping system 440 or anything connected to the piping system 440 at a desired time.

It should be recognized that headers 460, 462, 464, 466 and branch lines 470 and 472 may be devised in various lengths and sizes to combine fluid flow from multiple cylinders (including cylinders 452, 454, 456, and 458) or multiple pumping devices (including pump 450) to cancel and attenuate undesirable frequencies created by those cylinders (including cylinders 452, 454, 456, and 458) and pumps (including pump 450) having various arrangements. Thus, headers (including headers 460, 462, 464, 466) may have unequal lengths to combine flows that do not have frequencies of 180 .degree. out of phase. Branch lines 470 and 472 may also have varied lengths and sizes to cancel and attenuate pressure waves or frequencies other than those that are 180 .degree. out of phase.

For example, in the embodiment illustrated in FIG. 4, the first and second headers 460 and 462 may be the same length to combine the pressure waves propagating from the first and second cylinders 452 and 454 at 180 degrees out of phase. Similarly, the third and fourth headers 464 and 466 may be the same length to combine the pressure waves propagating from the third and fourth cylinders 456 and 458 at 180 degrees out of phase. While pulsations or pressure waves in a primary wavelength created by the first and second cylinders 452 and 454 and odd harmonics of that primary wavelength may be cancelled or attenuated by such a combination of the flows propagating from the first and second cylinders 452 and 454, pulsations or pressure waves in other undesirable wavelengths may still exist in the combined flow leaving the first side junction 474. Similarly, pulsations or pressure waves in a primary wavelength created by the third and fourth cylinders 456 and 458 and odd harmonics of that primary wavelength may be cancelled or attenuated by a similar combination of the flows propagating from the third and fourth cylinders 456 and 458 at 180 degrees out of phase. Nonetheless, pressure waves or pulsations in other undesirable wavelengths may still exist in the combined flow leaving second side junction 476. The pulsations or pressure waves may, furthermore, exist in various undesirable wavelengths because, for example, the pump 450 may be a reciprocating compressor that operates at various speeds or with certain cylinders 452, 454, 456, and 458 unloaded and configurations where flow or pressure waves is not smooth or similar but opposite on opposites sides of a pressure peak because, for example, of the operation of pistons (e.g., 230, 232, 234, 236, 238, 240, 330, 332, 334, 336, 338, and 340) working in conjunction with inlets and outlets at various pressures. Accordingly, the difference in the lengths of the first and second branch lines 470 and 472 may be selected to cancel or attenuate a primary wavelength remaining after the combination of the flows at the first side junction 474 and the second side junction 476. In an embodiment, such as that depicted in FIG. 4, where the pump 450 may operate at various speeds or with certain cylinders 452, 454, 456, and 458 unloaded, the wavelength selected to be cancelled or attenuated at branch line junction 478 may be selected to attenuate pressure waves or pulsations created at a mid-portion of the range of operation of the pump 450.

Junctions 474, 476, 478, 486, and 488, terminations, restrictions, certain bends, changes in pipe cross-sectional area, atmospheric discharge points and other piping system 440 components or features may reflect pressure waves and pulses upstream, for example back to the pump 450. Thus, the downstream waves, or waves propagating in the direction of fluid flow out of the pump 450, may, at those components and features, be partially reflected or otherwise travel back, or upstream, toward the discharge side of the pump 450. The downstream waves and reflected or otherwise formed upstream waves superimpose and may be measured together by a pressure transducer, while neither may be separately measurable by a pressure transducer. However, those waves may be otherwise tracked, such as by gas flow simulation software in one embodiment. That software may be, for example, the one dimensional gas flow simulation software developed by OPTIMUM Power Technology. A designer can use the gas flow simulation software to observe the effect of positioning the junctions and other piping components that may reflect pressure waves and thus determine the pipe lengths extending to those components that cause the upstream waves so as to affect the performance of the pump 450 and piping system 440. Depending upon the positioning of the junctions and reflective components and the pipe lengths used to attach those reflective components to the system, system performance criteria, such as flow rate or efficiency, may be improved.

In one embodiment, for example, the fluid pumping system 440 may be made more efficient by locating junctions 474, 476, 478, 486, and 488 at appropriate positions in relation to the pump 450 or other components of the piping system 440. For example, the side junctions 474, 476 may be located at an appropriate distance from the pump 450 to reflect pressure waves back to the pump 450 outlet of one or more cylinders 452, 454, 456, and 458 of the pump 450 such that those waves are at a low or lower pressure point at the cylinder outlets 441, 442, 443, and 444 when the pistons of the cylinders 452, 454, 456, and 458 are at a higher velocity or at or near the middle of the piston stroke. Such a phase arrangement may decrease the energy needed to cause the piston to move the same amount of fluid flow out of the pump, and thus increase pump and system efficiency.

Alternatively, in another embodiment, the fluid pumping system 440 may increase flow capacity by locating junctions 474, 476, 478, 486, and 488 at appropriate positions in relation to the pump 450 or other components of the piping system 440. For example, the side junctions 474, 476 may be located at an appropriate distance from the pump 450 to reflect pressure waves back to the pump 450 outlet of one or more cylinders 452, 454, 456, and 458 of the pump 450 such that those waves are at a low or lower pressure point at the cylinder outlets 441, 442, 443, and 444 when the pistons of the cylinders 452, 454, 456, and 458 are at a lower velocity, for example the pistons in those cylinders 452, 454, 456, and 458 may be at or near the ends of their strokes. Such a phase arrangement may increase flow rate.

In embodiments, the location of any combination of the junctions 474, 476, 478, 486, and 488 can be adjusted to increase flow capacity or improve pump 450 efficiency. Note that, as described above, various components and features of the piping system 440 may each cause wave reflections. Those components and features may be thus be adjusted such that the total, superimposed reflected or otherwise upstream-moving wave is at a low or lower pressure point at the cylinder outlets 441, 442, 443, and 444 when the cycles of the cylinders 452, 454, 456, and 458 are at a higher velocity at or near the middle of the piston strokes (for efficiency) or a lower velocity at or near the ends of the piston strokes (for increased flow capacity) or at any desired point in the cycles of the cylinders 452, 454, 456, and 458 or stroke of the pistons in the cylinders 452, 454, 456, and 458.

The time it takes for a reflected wave to reach a destination varies dependent upon the lengths of conduits extending between a reflective component and the destination and the acoustic velocity of the fluid. Thus, for example, the time required for a wave reflected from the first side junction 474 to the first cylinder outlet 452 outlet 441 will depend on the length of the first header 460 and the acoustic velocity of the fluid flowing through the first header 460 and carrying the wave.

In embodiments, gas flow simulation software, for example, may be used to specify the location of one or more other junctions (e.g., 478, 488) to reduce or otherwise affect pressure at the outlet of one or more cylinders 452, 454, 456, and 458 of the pump 450, recognizing that waves partially reflected back upstream (e.g. at junction 488) may themselves be partially reflected back downstream as they encounter junctions (e.g. 478, 474, 476) on their way upstream toward the pump 450. Such additional reflections may be simulated by, for example, the one dimensional gas flow simulation software developed by OPTIMUM Power Technology or other software.

In one embodiment, the length of pipe (e.g., headers 460, 462, 464, and 466) extending from a cylinder outlet (e.g., 441, 442, 443, and 444) to a first junction (e.g., 474 and 476) may be determined to produce the desired operation of the pump 450 (e.g., high flow, low power consumption, a desired flow at a desired power consumption, or other desired combination operating characteristics). Next, the length of a pipe (e.g., branch lines 470 and 472) extending from the first junction (e.g., 474 and 476) to a second junction (e.g., 478) may be determined to produce the desired operation of the pump 450.

Additionally, the aforementioned positioning of junctions and specification of pipe lengths and other specifications that may affect pressure at a pump based on reflected waves may be applied to systems other than the piping system 440 of FIG. 4. Thus, for example, in an embodiment the piping system 540 of FIG. 5 may be designed using the one dimensional gas flow simulation software developed by OPTIMUM Power Technology or other software to specify locations of junctions 574, 576, 578, 586, and/or 588 to reduce or otherwise affect pressure at the pump 550 based, at least in part, on reflected waves. Similarly, in the embodiment of the six-cylinder reciprocating compressor type pump 694 system 600, that software may be used to specify locations of junctions 660, 662, and/or 678 to reduce or otherwise affect pressure at the pump 550 based, at least in part, on reflected waves.

Further attenuation may be accomplished by adding one or more tuned loops, such as tuned loop 480 illustrated in FIG. 4, to the piping system 440 to attenuate one or more additional frequencies of pressure waves or pulsations in the fluid flowing through the piping system 440. The tuned loops 480 may be located anywhere desired in the piping system 440, such that the tuned loop 480 may, for example, be located in or between the headers 460, 462, 464, and 466 and in or between the branch lines 470 and 472.

The tuned loop 480 illustrated in FIG. 4 includes or is attached to the connecting conduit 490 leading from the branch line junction 478 and coupled at its discharge to the tuned loop inlet junction 486. It is noted that the branch line junction 478 may be attached directly to the inlet junction 486 and the inlet conduit 490 may not be used in an embodiment. The inlet junction 486 is coupled to a first or inlet end of a first attenuating conduit 482 and a first or inlet end of a second attenuating conduit 484. The first and second attenuating conduits 482 and 484 are coupled to an outlet junction 488 at their second or discharge ends and the outlet junction 488 discharges into the discharge conduit 492.

A pressure wave or pulsation attenuation system, such as the piping system 440 illustrated on the outlet side of the pump 450 in FIG. 4 may alternately or in addition be used on the inlet (e.g., 804 and 904 as shown in FIGS. 8 and 9) side of a pump such as the pump 450 in FIG. 4. Thus, all or any part of the piping system 440 illustrated on the outlet side of the pump 450 in FIG. 4 may be applied to the pump 450 inlet (e.g., 804 and 904 as shown in FIGS. 8 and 9), the pump 450 outlet (e.g., 808 and 908 as shown in FIGS. 8 and 9), or both the inlet and the outlet of the pump 450. Moreover, a piping system 440 may combine flow from cylinders 452, 454, 456, and 458 of more than one pump 450 so that, for example, headers may combine flows from different pumps (including pump 450 and one or more other pumps not illustrated) or different cylinders (including cylinders 452, 454, 456, and 458 and one or more other cylinders not illustrated) of different pumps (e.g., pump 450 and one or more other pumps not illustrated) and branch lines (e.g., 470 and 472) may combine flows from different pumps (including pump 450 and one or more other pumps not illustrated) or different cylinders (including cylinders 452, 454, 456, and 458 and one or more other cylinders not illustrated) of different pumps (including pump 450 and one or more other pumps not illustrated).

It should also be recognized that traditional pulsation dampening devices, such as bottles, may be incorporated into the fluid pumping system 440 if desired.

Figure 5:
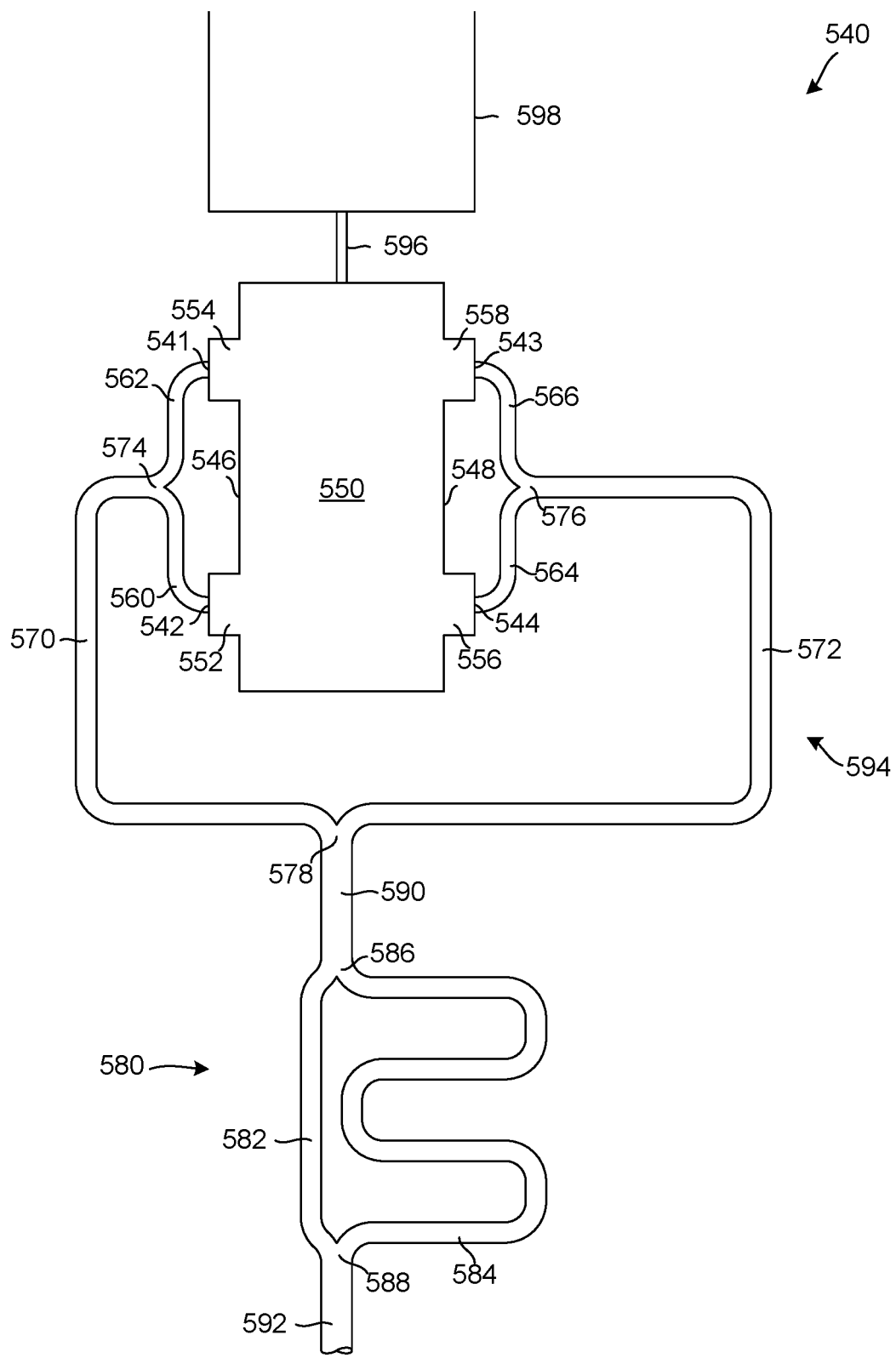
FIG. 5 illustrates an embodiment of an inlet piping system.

FIG. 5 illustrates an inlet piping system 540 that may operate on inlet fluids similar to way the outlet piping system 540 illustrated in FIG. 4 operates on outlet fluids and may be used on the same pump 450 with which the outlet piping system operates.

The inlet piping system 540 is connected to inlets 541, 542, 543, and 544 of the cylinders 552, 554, 556, and 558 of the pump 550 illustrated in FIG. 5. Thus, the pump 550 cylinders 552, 554, 556, and 558 include inlets 541, 542, 543, and 544, respectively. The cylinder inlets 541, 542, 543, and 544 are attached to a first inlet header 562, a second header 560, a third inlet header 566, and a fourth inlet header 564, respectively. The first inlet header 562 and second inlet header 560 are attached to a first inlet branch line 570 at a first side inlet junction 574 and the third inlet header 566 and fourth inlet header 564 are attached to a second inlet branch line 572 at a second side inlet junction 576. The first inlet branch line 570 and second inlet branch line 572 are attached to an inlet tuned loop 580 at a branch junction 578.

A connecting conduit 590 leads to the inlet branch line junction 578 from an outlet of a tuned loop inlet junction 586. The tuned loop inlet junction 586 also has two inlets, the first inlet being attached to a first end a first attenuating conduit 582 of the tuned loop 580 and the second inlet being attached to a first end of a second attenuating conduit 584 of the tuned loop 580. A second end of the first attenuating conduit 582 is attached to a first outlet of a tuned loop inlet junction 588 and a second end of the second attenuating conduit 582 is attached to a second outlet of the tuned loop inlet junction 588. An inlet of the tuned loop inlet junction is attached to a supply conduit 592.

The tuned loop 580 may operate to cancel or attenuate pressure waves or pulsations propagating through the fluid flowing toward the pump 550. Those pressure waves or pulsations propagating through the fluid may be created by the pump 550 or by one or more other system features (not shown) acting on the fluid flow either upstream or downstream of the tuned loop 580. The inlet branch lines 570 and 572 can similarly operate to cancel or attenuate pressure waves or pulsations propagating through the fluid flowing toward the pump 550 and the inlet headers 560, 562, and 564, 566 may operate to cancel or attenuate pressure waves or pulsations propagating through the fluid flowing toward the pump 550.

In an embodiment, the inlet (suction) piping system 540 may be configured to increase gas flow capacity. Thus, for a double-acting piston arrangement, the resultant pressure wave propagating toward one or more of the cylinders 552, 554, 556, and 558 is at a higher or high pressure point at one or more of the inlets 541, 542, 543, and 544 when the piston of its corresponding cylinder 552, 554, 556, or 558 is at or near the end of its stroke. For a single-acting piston arrangement, the resultant pressure wave propagating toward one or more of the cylinders 552, 554, 556, and 558 is at a higher or high pressure point at one or more of the inlets 541, 542, 543, and 544 when the piston of its corresponding cylinder 552, 554, 556, or 558 is at or near the end of its stroke moving in the direction in which it is suctioning gas into the cylinder.

In an embodiment, the inlet (suction) piping system 540 may be configured to increase efficiency. Thus, for a double-acting piston arrangement, the resultant pressure wave propagating toward one or more of the cylinders 552, 554, 556, and 558 is at a higher or high pressure point at one or more of the inlets 541, 542, 543, and 544 when the piston of its corresponding cylinder 552, 554, 556, or 558 is at or near the middle of its stroke. For a single-acting piston arrangement, the resultant pressure wave propagating toward one or more of the cylinders 552, 554, 556, and 558 is at a higher or high pressure point at one or more of the inlets 541, 542, 543, and 544 when the piston of its corresponding cylinder 552, 554, 556, or 558 is at or near the middle of its stroke moving in the direction in which it is suctioning gas into the cylinder.

As used herein in relation to a piston stroke on the inlet (suction) side of a piping system, "at or near an end" or a similar term regarding a piston stroke refers to (for a double-acting piston) a position of the piston closer to either end of the cylinder than the middle of the cylinder, and refers to (for a single-acting piston) a position of the piston closer to the end of the cylinder where the piston is finishing or has just finished suctioning gas. That term or a similar term thus encompasses both a single-acting and double-acting cylinder and piston unless otherwise specified.

As used herein in relation to a piston stroke on the outlet side of a piping system, "at or near the middle" or a similar term regarding a piston stroke refers to (for a double-acting piston) a position of the piston closer to the middle of the cylinder than either end of the cylinder, and refers to (for a single-acting piston) a position of the piston closer to the middle of the cylinder when the piston is moving in a direction in which it is suctioning gas into the cylinder. That term or a similar term thus encompasses both a single-acting and double-acting cylinder and piston unless otherwise specified.

Figure 6:
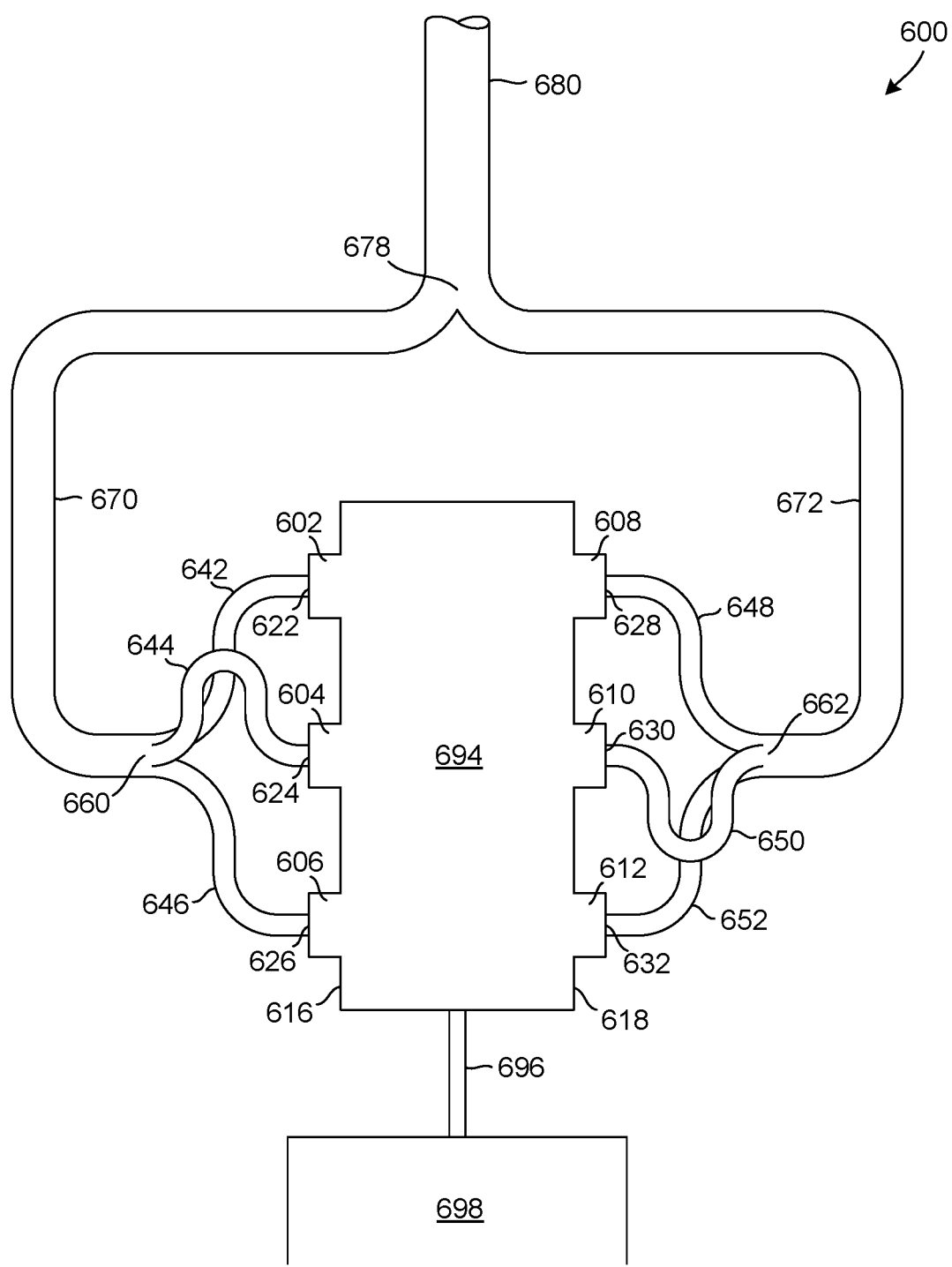
FIG. 6 illustrates an embodiment of a six-cylinder reciprocating compressor type pump system.

FIG. 6 illustrates an embodiment of a six-cylinder reciprocating compressor type pump 694 system 600. A first cylinder 602 has a first outlet 622 connected to a first header 642, a second cylinder 604 has a second outlet 624 connected to a second header 644, a third cylinder 606 has a third outlet 626 connected to a third header 64, a fourth cylinder 608 has a fourth outlet 628 connected to a fourth header 648, a fifth cylinder 610 has a fifth outlet 630 connected to a fifth header 650, and a sixth cylinder 612 has a sixth outlet 632 connected to a sixth header 652.

The pump 694 is operated by a motor 698 driving a shaft 696 that causes pistons (e.g., 230, 232, 234, 236, 238, 240, 330, 332, 334, 336, 338, and 340 illustrated in FIGS. 2 and 3) to reciprocate in each of the cylinders 602, 604, 606, 608, 610, and 612. While the cylinders 602, 604, 606, 608, 610, and 612 may be arranged in any way desired, the cylinders 602, 604, 606, 608, 610, and 612 in the embodiment illustrated in FIG. 6 are arranged with three cylinders 602, 604, and 606 on a first side 616 of the pump 694 and three other cylinders 608, 610, and 612 on a second side 618 of the pump 694.

The first, second and third headers 642, 644, and 646, respectively, are attached to inlets of a first side junction 660 in FIG. 6, but the fluid flowing through the first, second and third headers 642, 644, and 646 could otherwise be combined by placing those fluid flows in fluid communication through multiple junctions or otherwise as desired. Similarly, The fourth, fifth and sixth headers 648, 650, and 652 are attached to inlets of a second side junction 662 in FIG. 6, but the fluid flowing through the fourth, fifth and sixth headers 648, 650, and 652 could also otherwise be combined by placing those fluid flows in fluid communication as desired. A first branch line 670 carries the fluid flow from the first side junction 660 to a branch line junction 678 and a second branch line 672 carries the fluid flow from the second side junction 662 to the branch line junction 678. The fluid then flows from the branch line junction 678 to an outlet conduit 680 or, alternately, to a desired system (not shown).

In an embodiment where peak pressure waves, also referred to as a type of pulsation, are offset, the lengths of the branch lines 670 and 672 may be equal. When such equal length branch lines 670 and 672 used in conjunction with cylinders 602, 604, 606, 608, 610, and 612 having offset operation (such as the offset cylinder operation illustrated and discussed in connection with FIGS. 2 and 3), the branch lines 670 and 672 may be effective to cancel or attenuate pressure waves at varying pump 694 speeds.

For example, in the embodiment depicted in FIG. 6, the cycles of the three cylinders 602, 604, and 606 on the first side 616 of the pump 694 may be offset by 60 degrees of shaft rotation (in a double acting compressor configuration) one from another. The three cylinders 608, 610, and 612 on the second side 618 of the pump 694 may also be offset by 60 degrees of shaft rotation (in a double acting compressor configuration) one from another. In addition, the cylinders 602, 604, and 606 on the first side 616 may be offset from the cylinders 608, 610, and 612 on the second side 618 by 30 degrees such that pressure peaks or pulsations from the second side 618 cylinders 608, 610, and 612 occur at or near a midpoint in time between pressure peaks or pulsations from the first side 616 cylinders 602, 604, and 606. In that way, there can be twelve pressure peaks or pulsations leaving the pump 694 at equally spaced time intervals per rotation of the shaft 696. For example, the first cylinder 602 may reach peak discharge pressure on a first of its two strokes per cycle at 0 degrees of shaft 696 rotation, the fourth cylinder 608 may reach peak discharge pressure on a first of its two strokes per cycle at 30 degrees of shaft 696 rotation, the second cylinder 604 may reach peak discharge pressure on a first of its two strokes per cycle at 60 degrees of shaft 696 rotation, the fifth cylinder 610 may reach peak discharge pressure on a first of its two strokes per cycle at 90 degrees of shaft 696 rotation, the third cylinder 606 may reach peak discharge pressure on a first of its two strokes per cycle at 120 degrees of shaft 696 rotation, and the sixth cylinder 612 may reach peak discharge pressure on a first of its two strokes per cycle at 150 degrees of shaft 696 rotation. The first cylinder 602 may reach peak discharge pressure on a second of its two strokes per cycle at 180 degrees of shaft 696 rotation, the fourth cylinder 608 may reach peak discharge pressure on a second of its two strokes per cycle at 210 degrees of shaft 696 rotation, the second cylinder 604 may reach peak discharge pressure on a second of its two strokes per cycle at 240 degrees of shaft 696 rotation, the fifth cylinder 610 may reach peak discharge pressure on a second of its two strokes per cycle at 270 degrees of shaft 696 rotation, the third cylinder 606 may reach peak discharge pressure on a second of its two strokes per cycle at 300 degrees of shaft 696 rotation, and the sixth cylinder 612 may reach peak discharge pressure on a second of its two strokes per cycle at 330 degrees of shaft 696 rotation.

Accordingly, combining the pump 200 embodiment illustrated in FIG. 2 with the partial system 600 embodiment illustrated in FIG. 6, where six cylinders create 12 peak pressure points or pulsations per shaft 204 rotation with each peak pressure point or pulsation occurring at 30 degree intervals, fluid flowing from three cylinders 250, 252, and 254 having six peak pressure points or pulsations occurring at 60 degree intervals may be combined at a first junction (e.g., junction 660 in FIG. 6) and fluid flowing from three other cylinders 256, 258, and 260 having six peak pressure points or pulsations occurring at 60 degree intervals may be combined at a second junction (e.g., junction 662 in FIG. 6). By so combining fluid flow using equal length headers (e.g., headers 642, 644, 646 and 648, 650, 652 in FIG. 6) pressure waves are combined out of phase such that the pressure of the combined flow leaving the side junctions 660 and 662 has lower amplitude pressure waves with lower pressure peaks or pulsations.

When flow from a first set of cylinders (first, second, and third cylinders 602, 604, and 606 in the embodiment depicted in FIG. 6) is combined with flow from a second set of cylinders (fourth, fifth, and sixth cylinders 608, 610, and 612 in the embodiment depicted in FIG. 6) where pressure peaks or pulsations created by the first set of cylinders (first, second, and third cylinders 602, 604, and 606 in the embodiment depicted in FIG. 6) are offset from pressure peaks or pulsations created by the second set of cylinders (fourth, fifth, and sixth cylinders 608, 610, and 612 in the embodiment depicted in FIG. 6) the headers 642, 644, 646, 648, 650, and 652 may all be of equal length and the branch lines 670 and 672 that combine the flow from the first set of cylinders and the second set of cylinders The embodiment illustrated in FIG. 6 is one example of combining fluid flow from cylinders at least some of which operate out of phase. It should be recognized, however, that various systems, methods, and apparatuses may be used to combine fluid flowing from multiple cylinders operating in or out of phase to cancel or attenuate pressure waves or pulsations propagating through the fluid. Thus, any number of cylinders may be combined out of phase in one or more sets of cylinders and any number of sets of cylinders may be combined out of phase by branch lines.

In the embodiment illustrated in FIG. 6, the pressure peaks or pulses created by the first set of cylinders 602, 604, and 606 are approximately 180 degrees out of phase from the pressure peaks or pulses created by the second set of cylinders 608, 610, and 612. Accordingly, if the headers 642, 644, 646, 648, 650, and 652 connected to all six cylinders 602, 604, 606, 608, 610, and 612 are of equal length and the branch lines 670 and 672 connecting the flow from the first side 616 to the flow from the second side 618 are of equal length, then the combined pressure waves emanating from the first side junction 660 will be 180 degrees out of phase with the combined pressure waves emanating from the second side junction 662 and the flows passing through the branch lines 670 and 672 will combine at the branch junction 678 180 degrees out of phase, thereby further reducing pressure waves or pulsations propagating through the branch lines 670 and 672.

Figure 7:
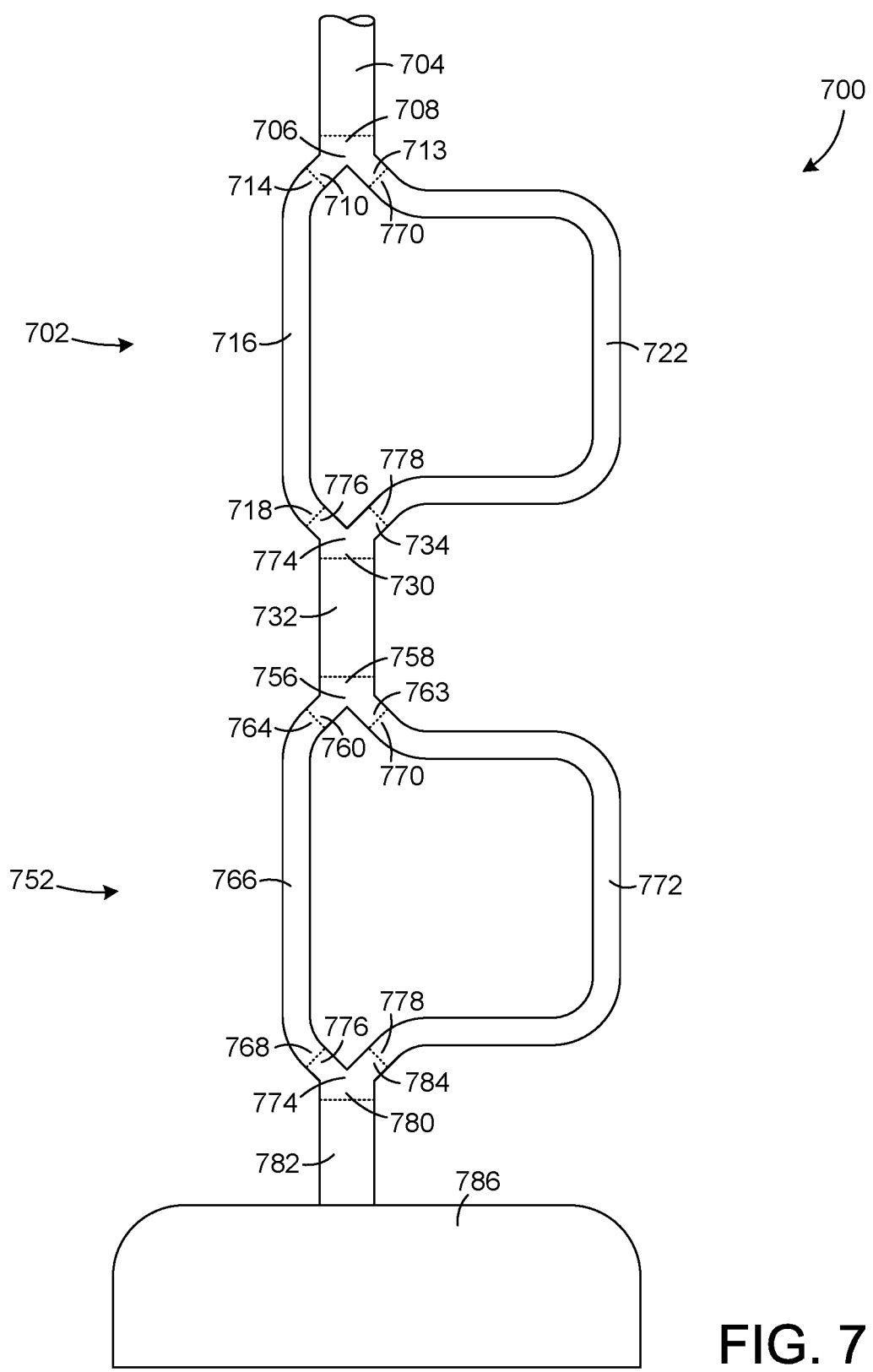
FIG. 7 illustrates an embodiment of a tuned loop network including two tuned loops.

FIG. 7 illustrates a tuned loop network 700 that includes two tuned loops 702 and 752. Those two tuned loops 702 and 752 may each be similar to the tuned loop 102 illustrated in FIG. 1. Those two tuned loops 702 and 752 may furthermore be incorporated into any portion of a fluid pumping system such as the fluid pumping system 440 illustrated in FIG. 4 (e.g., in one or more headers 460, 462, 464, and 466, one or more branch lines 470 and 472, or in place of or in addition to the tuned loop 480).

A fluid, such as a gas or liquid may be pumped through the tuned loop network 700 by, for example, a pump, such as the pump 450 illustrated in FIG. 4, the pump 550 illustrated in FIG. 5, the pump 694 illustrated in FIG. 6, the pump 806 illustrated in FIG. 8, the pump 906 illustrated in FIG. 9, or any other pump described herein or other than as described herein and the pump may be a reciprocating compressor. The lengths of the various conduits (e.g., 716, 722, 766, 772) may be adjusted to cancel primary pulsations and harmonics over a range of the pump (e.g., 450, 550, 694, 806, and 906) operating speeds or conditions.

The first tuned loop 702 illustrated in FIG. 7 includes an inlet conduit 704 coupled to a first inlet junction 706. The first inlet junction 706 includes an inlet 708, a first outlet 710 and a second outlet 713. The first tuned loop 702 illustrated in FIG. 7 also includes a first attenuating conduit 716 having a first end 714 coupled to the first outlet 710 of the inlet junction 706, having a first length, and having a second end 718 opposite the first end 714.

The first tuned loop 702 illustrated in FIG. 7 also includes a second attenuating conduit 722 having a first end 720 coupled to the second outlet 713 of the inlet junction 706, having a length that is approximately equal to the length of the first attenuating conduit 716 plus half a first primary wavelength of a pressure wave or pulsations or vibrations propagating in a fluid flowing through the tuned loop network 700. The first primary wavelength may be selected from a range of wavelengths that may be imparted on the fluid by the pump (e.g., 450, 550, 694, 806, and 906).

The term "wavelength," as used in this section, may indicate the distance over which a wave's shape repeats, wherein the wave is formed by the repeating pressure variations or pulsations of the pump (e.g., 450, 550, 694, 806, and 906) which may be caused by the motion of a piston (e.g., 230, 232, 234, 236, 238, 240 330, 332, 334, 336, 338, and 340 illustrated in FIGS. 2 and 3) in a cylinder (e.g., 452, 454, 456, 458, 552, 554, 556, 558, 602, 604, 606, 608, 610, and 612 illustrated in FIGS. 4, 5, and 6) compressing a gaseous fluid. The term "wavelength," as used in this section, may also indicate the distance between consecutive corresponding points of a repeating wave, such as a pressure oscillation wave, wherein the corresponding points of the wave may correspond to one or more positions of the piston in the cylinder (e.g., 452, 454, 456, 458, 552, 554, 556, 558, 602, 604, 606, 608, 610, and 612 illustrated in FIGS. 4, 5, and 6). That distance may furthermore be measured in length of pipe, such that the difference in length between the first attenuating conduit 716 and the second attenuating conduit 722 may be selected such that fluid flowing through those conduits is combined at a first outlet 730 such that pressure waves or pulsations in the fluid are attenuated.

The first tuned loop 702 illustrated in FIG. 7 further includes the first outlet junction 724 having a first inlet 726 coupled to the second end 718 of the first attenuating conduit 716, a second inlet 734 coupled to the second end 728 of the second attenuating conduit 722, and an outlet 730. The outlet 730 of the first outlet junction 724 may be attached to a discharge conduit 732 coupling the first tuned loop 702 to the second tuned loop 752.

The second tuned loop 752 illustrated in FIG. 7 includes a second inlet junction 756 in fluid communication with the first outlet junction 724. The outlet junction 724 of the first tuned loop 702 may be coupled directly to the inlet junction 756 of the second tuned loop 752 without the use of the connecting conduit 732 or the connecting conduit 732 may interconnect the outlet junction 724 to the inlet junction 756. The second inlet junction 756 includes an inlet 758, a first outlet 760 and a second outlet 763. The second tuned loop 752 illustrated in FIG. 7 also includes a third attenuating conduit 766 having a first end 764 coupled to the first outlet 760 of the inlet junction 756, the third attenuating conduit 766 having a first length and having a second end 768 opposite the first end 764.

The second tuned loop 752 illustrated in FIG. 7 also includes a fourth attenuating conduit 772 having a first end 770 coupled to the second outlet 763 of the second tuned loop 752 inlet junction 756, the fourth attenuating conduit 772 having a length that is approximately equal to the length of the third attenuating conduit 766 plus half a second primary wavelength of pressure variations or vibrations propagating in the fluid flowing through the tuned loop network 700, and having a second end 778.

The second primary wavelength is also selected from a range of wavelengths that may be imparted on the fluid by the pump (e.g., 450, 550, 694, 806, and 906). The second primary wavelength will not be the same as the first primary wavelength since the first tuned loop 702 and the second tuned loop 752 are tuned to attenuate different wavelengths in this embodiment. The second primary wavelength will also typically not be offset from the first primary wavelength by half the first primary wavelength since the purpose of the second tuned loop 752 in this embodiment is not to cancel certain even harmonics of the first tuned loop 702. Rather, the first and second tuned loops 702 and 752 are arranged to provide good attenuation over a range of pressure wave or pulsation frequencies that may be produced, for example, by adjusting the speed of a pump (e.g., 450, 550, 694, 806, and 906).

The second tuned loop 752 illustrated in FIG. 7 further includes a second outlet junction 774 having a first inlet 776 coupled to the second end 768 of the third attenuating conduit 766, a second inlet 784 coupled to the second end 778 of the fourth attenuating conduit 772, and an outlet 780. The outlet 780 of the second outlet junction 774 may be attached to a system through which the fluid is being pumped through, for example, a system coupling conduit 782.

Each of the tuned loops 702 and 752 of the pulsation attenuation network 700 may include two conduits 716, 722 or 766, 772, such as pipes of approximately equal area and different lengths, that extend from a header 704 at a junction 706 or 756 and that are recombined at a pipe 732 or 782 or vessel 786. When the areas of the two conduits 716, 722 or 766, 772 are equal the two pressure waves or pulses carried therein can have equal energy to effectuate attenuation of the pressure waves or pulses when the fluid flow carrying the pressure waves and pulses are recombined.

In alternate embodiments, the conduits 716, 722 and 766, 772 of the tuned loops 702 and 752 may be of unequal cross-sectional size and the lengths of those conduits 716, 722 and 766, 772 may be varied by other than half of a wavelength of the pressure wave or pulse stream carried in the fluid flowing through the conduits 716, 722 and 766, 772 to be attenuated, so as to effectuate pressure wave or pulsation attenuation.

Multiple tuned loops, such as the tuned loops 702 and 752 illustrated in FIG. 7 may be combined with the header cancellation system 460-478 illustrated in FIG. 4. For example, tuned loops 702 and 752 may be coupled to branch line junction 478 in place of or in addition to the tuned loop 480 illustrated in FIG. 4. In another embodiment, one or more tuned loops, such as the tuned loops 702 and 752 illustrated in FIG. 7 may be connected to the inlet (e.g., 804 and 904 as shown in FIGS. 8 and 9) side of the pump (e.g., 450, 550, 694, 806, and 906), with or without additional attenuation conduits, such as conduits 460, 462, 464, 466, 468, 470, and 472 shown on the outlet (e.g., 808 and 908 as shown in FIGS. 8 and 9) side of the pump 450 illustrated in FIG. 4.

The inlet junctions (e.g., 706 and 756) may divide the fluid stream into two equal parts using two half-round or D-shaped ports that become round and have a substantially constant area. A similarly configured outlet junction (e.g., 724 and 774) may be used to recombine the divided streams at the end of the tuned loop (e.g., 702 and 752).

Using the tuned loops of FIG. 7 as an example, wherein the various configurations described in connection with FIG. 7 may be incorporated into various configurations including those illustrated and described in connection with FIGS. 4, 5, 6, 8, and 9, the shorter of the two conduits 716 and 766 in the tuned loops 702 and 752 may be of a selected length and the longer of the conduits 722 and 772 may be equal to the length of the shorter of the conduits 716 and 766 plus half of a wavelength of pulsations, vibrations, or pressure waves propagating in the fluid of a primary frequency to be canceled or attenuated.

FIG. 8 illustrates an embodiment of a tuned loop network 800 having a first tuned loop 802 in fluid communication with the inlet 804 of a pump 806 and a second tuned loop 852 in fluid communication with the outlet 808 of the pump 806. In the embodiment illustrated in FIG. 8, the inlet 804 may also be referred to as a suction side of the pump 806 and the outlet 808 may also be referred to as a discharge side of the pump 806. Those tuned loops 802 and 852 may be configured as shown in FIG. 1, 4, or 7 and as described in connection with FIG. 1, 4, or 7. Either or both of those tuned loops 802 and 852 may furthermore be used in connection with the piping system 440 illustrated and discussed in connection with FIG. 4, for example, or another piping system.

Pressure waves and pulsations generally exist in both the inlet 804 and outlet 808 of a pump 806. Therefore, attenuating pressure waves and pulsations in both the inlet 804 and outlet 808 of the pump 806 by applying at least one tuned loop 802 and 852 at each of the inlet 804 and outlet 808 of the pump 806 may be beneficial to reduce pressure waves and pulsations existing prior to the inlet 804 and propagating from the outlet 808.

FIG. 9 illustrates yet another embodiment wherein a suction tuned loop network 902 is placed at the suction 904 side of a pump 906 and a discharge tuned loop network 952 is placed at the discharge side 908 of the pump 906. The suction tuned loop network 902 may include any desired number of tuned loops such as, for example the two tuned loops 910 and 912 illustrated in FIG. 9. Similarly, the discharge tuned loop network 952 may include any desired number of tuned loops such as, for example, the two tuned loops 960 and 962 illustrated in FIG. 9. The suction tuned loop network 902 and discharge tuned loop network 952 may furthermore be constructed as illustrated in and described in connection with FIGS. 1, 4, 5, and 7.

It should be noted that the acoustic velocity of a gas being pumped may vary from the inlet 904 to the outlet 908 of a pump 906 and, for at least that reason, the tuned loop configurations on the inlet 904 side and outlet 908 sides of the pump 906 may not be identical. It should also be recognized that a tuned loop network of two or more tuned loops 910, 912, and 960, 962 may be used on the inlet 904, the outlet 908, or both the inlet 904 and the outlet 908 of the pump 906.

Simulations have shown that tuned loop networks having three tuned loops are likely to provide substantial benefit over networks having two tuned loops in certain applications and that tuned loop networks having four tuned loops are likely to provide substantial benefit over networks having three tuned loops in certain applications. Thus, it is contemplated that three, four, or more tuned loops 910, 912, and 960, 962 may be placed on either or each side of the pump 906 as required or desired to attenuate pulsations, vibrations, or other waves present in fluid received at or discharged from the pump 906.

Other configurations having two or more tuned loops 910, 912 and 960, 962 placed on one or both sides 904 and 908 of the pump 906 are also possible to attenuate one or more primary frequencies or an entire range of frequencies. As has been discussed, a range of frequencies may exist where, for example, the speed of the pump 906 is varied.

Tuned loops networks such as those illustrated in FIGS. 9 (902 and 952) can create relatively steady pressure upstream or downstream of the pump 906 in comparison to the wide pressure variations that may exist in fluid flow created by the pump 906. When tuned loop networks (e.g., 902 and 952) are properly positioned, the pump 906 may require less power to create a desired pressure downstream in a pipe or vessel, may provide a greater differential pressure created by the pump 906, or both.

Using FIG. 9 as an example, a wavelength may be determined using the speed of the pump 906, the number of compression volumes (per rotation of the pump 906, for example), and the acoustic velocity of the fluid being pumped by the pump 906. Thus, a single-acting reciprocating compressor type pump 906 having a single cylinder may be used to compress a gas and propel the gas through the inlet 904 once per engine cycle, as an example.

Pumps (e.g., 450, 550, 694, 806, and 906) including reciprocating compressors frequently operate over a range of speeds. In this example, a single acting reciprocating compressor 906 operates at 600 rpm, which is equal to a primary frequency of 10 revolutions per second. A single compression occurs in each cylinder during each rotation of this single-acting reciprocating compressor 906. If the velocity of the gas is 1000 ft/sec., the gas moves 100 feet per revolution of the reciprocating compressor 906 and its half wavelength would be 50 feet. In a double-acting reciprocating compressor, which compresses the gas and propels the gas through the inlet 904 on both strokes, the wavelength is half the wavelength of a single-acting reciprocating compressor so that, in the example provided, half a wavelength would be 25 feet.

In a two-stage pressure wave or pulsation attenuation network (e.g., the tuned loop network 700 illustrated in FIG. 7 or the suction tuned loop network 902 or the discharge tuned loop network 952 illustrated in FIG. 9), the first pressure wave or pulsation attenuation device 702, 912, and 962 in the series may be designed to eliminate the most prevalent primary frequency expected to be present in the fluid passing through the pressure wave or pulsation attenuation network 700, 902, and 952. That primary frequency eliminating pulsation attenuation device 702, 912, and 962 may furthermore be the longest of the pressure wave or pulsation attenuation devices 702, 752, 912, 910, 962, and 960 in the series of pressure wave or pulsation attenuation devices 702, 752, 912, 910, 962, and 960 placed in series to form the pulsation attenuation network 700, 902, and 952.

Figure 10:
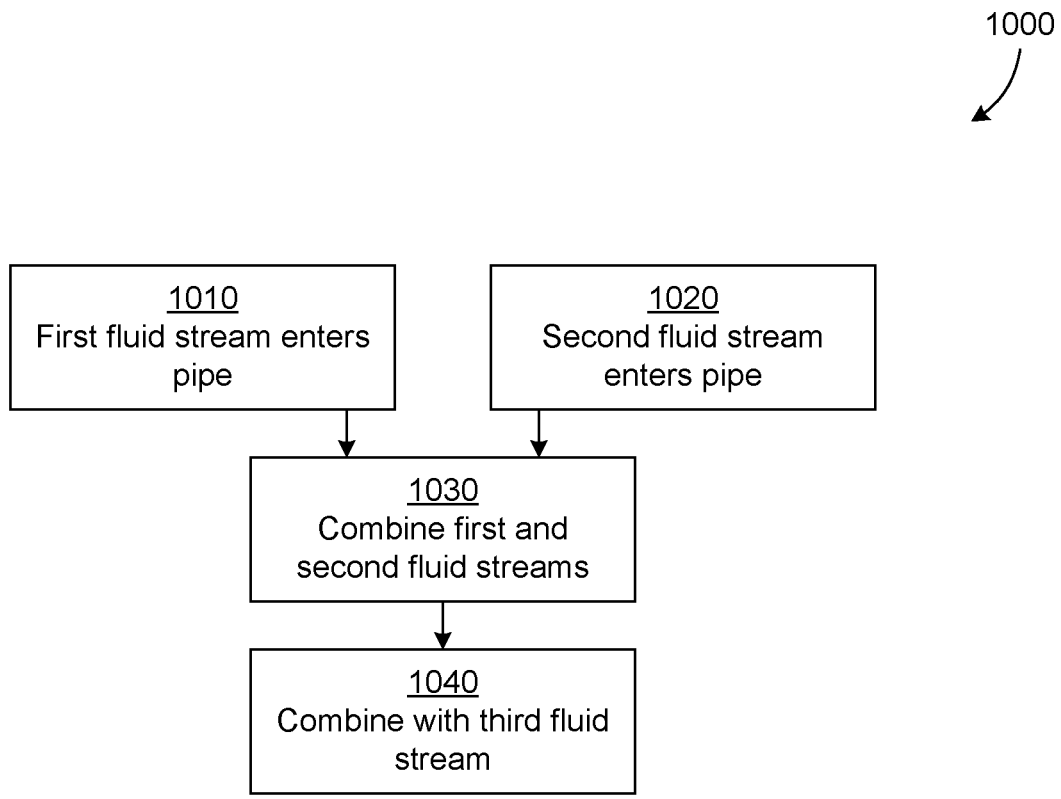
FIG. 10 is a flow chart of an embodiment of a method for attenuating pulsations, vibrations, or other undesirable waves in a fluid.

FIG. 10 illustrates an embodiment of a method for attenuating pulsations, vibrations, or other undesirable waves in a fluid 1000. The method for attenuating pulsations 1000 begins with a first wave, such as a pulse wave, entering a first pipe, duct, or conduit at 1010 and a second wave, such as a pulse wave, entering a second pipe, duct, or conduit at 1020. Each of the first wave and the second wave will propagate in a fluid, such as a liquid or gas, which is being pumped. At 1030, the first wave and the second wave are combined, for example, by conducting the first and second waves into a junction coupled to first and second branch conduits carrying fluid in which the first and second waves are propagating. The first and second waves may be attenuated by such a combination of waves where, for example, the waves are combined at a time when a pulse peak in the first wave joins near a pulse valley in the second wave.

To further attenuate pulses, vibrations, or other undesirable waves in a fluid, at 1040 the fluid that was combined at 1030 may be combined with another fluid in such a way as to attenuate waves existing in the combined fluid and the other fluid.

Such combinations of fluid as described at 1030 and 1040, wherein waves propagating in the fluid are combined out of phase, may result in a differential phase shift in the combined fluids, thereby attenuating the pulsations, vibrations, and other undesirable waves.

For example, in the method illustrated and described in connection with FIG. 10, fluid flows from two or more cylinders (e.g., 460, 462, 464, 466, 560, 562, 564, 566, 602, 604, 606, 608, 610, and 612) are combined at a junction (e.g., 474, 476, 574, 576, 660, and 662) to reduce variations or fluctuations in pressure waves propagating from those cylinders (e.g., 460, 462, 464, 466, 560, 562, 564, 566, 602, 604, 606, 608, 610, and 612) at 1030. The fluid flowing from the cylinders (e.g., 460, 462, 464, 466, 560, 562, 564, 566, 602, 604, 606, 608, 610, and 612) is combined such that pressure waves caused by operation of the cylinders (e.g., 460, 462, 464, 466, 560, 562, 564, 566, 602, 604, 606, 608, 610, and 612) join out of phase at 1030. In one embodiment, the flows are a gaseous fluid, such as natural gas. In an embodiment, periodic pressure waves exist in the flow propagating from each cylinder (e.g., 460, 462, 464, 466, 560, 562, 564, 566, 602, 604, 606, 608, 610, and 612) and the flows from two cylinders (e.g., 460, 462, 464, 466, 560, 562, 564, 566, 602, 604, 606, 608, 610, and 612) are combined 180 degrees out of phase at 1030. In another embodiment, the flows propagating from three or more cylinders are combined at 1030 such that pressure peaks or pulsations in the flows arrive at the place where the flows are combined at regular intervals, such as 60 degrees out of phase when combining flow from three cylinders (e.g., 602, 604, and 606 or 608, 610, and 612) or 45 degrees out of phase when combining flow from four cylinders.

The pressure waves in the fluid streams combined at 1030 may not be symmetrical such that a first wave near its peak pressure may be joined with a second wave near its low pressure so as to attenuate both waves, but not necessarily cancel both waves.

At 1040, a further reduction in the amplitude of pressure waves may be achieved by combining two or more flows of fluid that carry combined flows from two or more headers (for example, flow from side junctions 474, 476, 574, 576, 660, and 662) out of phase in a branch line junction for example, branch line junction 478, 578, or 678. In an embodiment, the combined header flows may be combined directly by, for example, connecting side junctions 660 and 662 directly in another junction such as branch line junction 678 without the use of branch lines 670 and 672. In another embodiment, as illustrated in FIGS. 4 and 6, combined header flow may be combined at side junctions (e.g., 474, 476 and 660, 662) and branch lines (e.g., 470, 472, 670, and 672) may carry flow from the side junctions (e.g., 474, 476 and 660, 662) to the branch line junction (e.g., 478 and 678).

Cylinders (e.g., 452, 454, 456, 458, 552, 554, 556, 558, 602, 604, 606, 608, 610, and 612) may be of varying capacity such that flows from the cylinders may be combined out of phase at intervals other than 360 degrees divided by the number of cylinders being combined. Moreover, the total flow traveling along two or more branch lines (e.g., 470, 472, 570, 572, 670, and 672) that are to be combined may vary, for example, in quantity or amplitude of pressure waves, such that flows through the branch lines may be combined out of phase at intervals other than 360 degrees divided by the number of branch lines to be combined.

Figure 11:
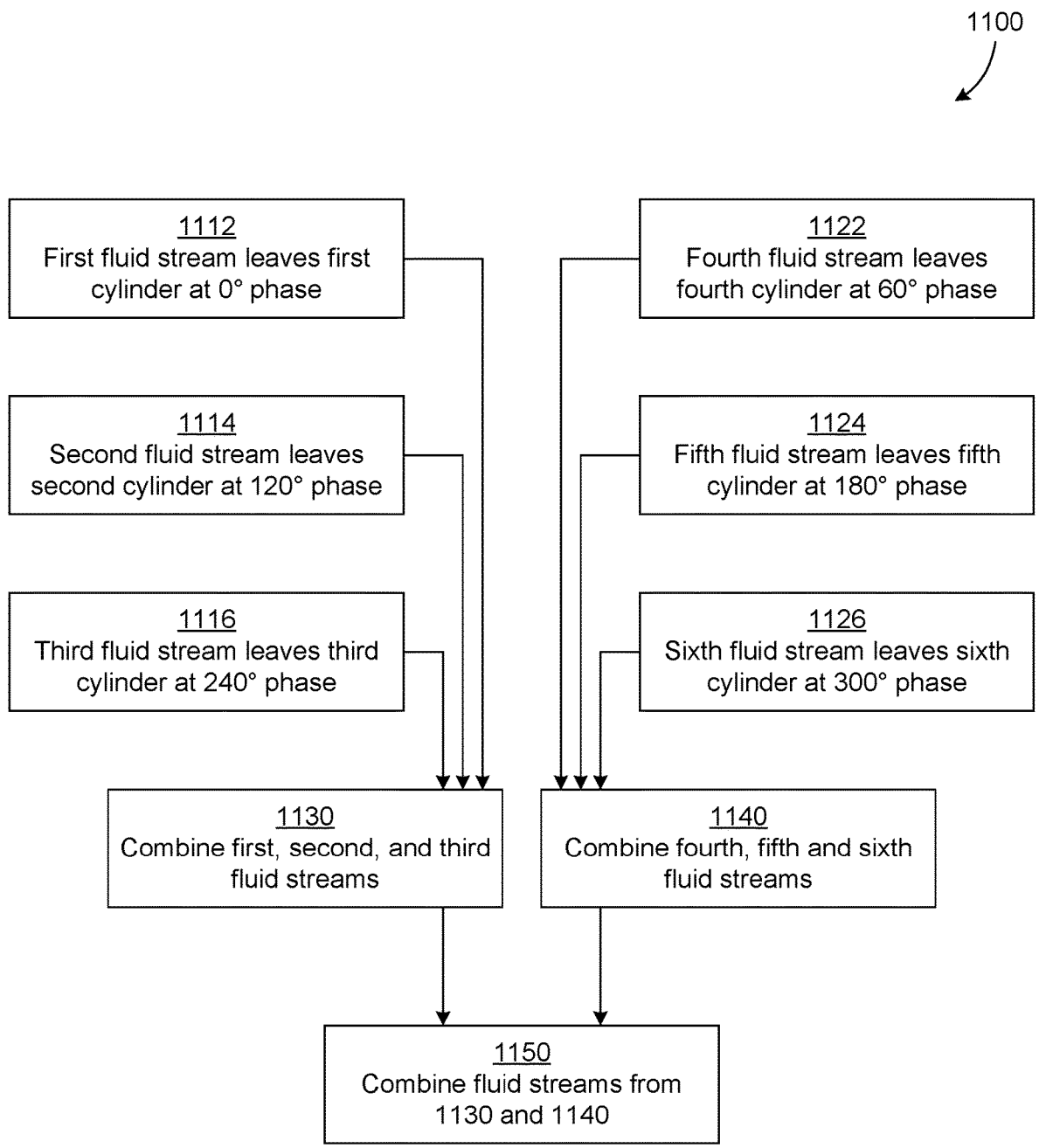
FIG. 11 is a flow chart of an embodiment of a method of attenuating pressure waves or pulsations created by a pump.

In accordance with one embodiment of pressure wave or pulsation attenuation, and depicted in the flow chart of FIG. 11, a method of attenuating pressure waves or pulsations created by a pump 1100 includes: discharging a first fluid stream from a first cylinder into a first conduit at 1112, discharging a second fluid stream from a second cylinder into a second conduit at 1114, discharging a third fluid stream from a third cylinder into a third conduit at 1116, discharging a fourth fluid stream from a fourth cylinder into a fourth conduit at 1122, discharging a fifth fluid stream from a fifth cylinder into a fifth conduit at 1124, discharging a sixth fluid stream from a sixth cylinder into a sixth conduit 1126, the first, second, third, fourth, fifth, and sixth conduits having equal lengths, and the pressure waves in the first, second, third, fourth, fifth, and sixth fluid streams having relative phases that vary by approximately 60 degrees at the points of discharge from the first, second, third, fourth, fifth, and sixth cylinders respectively.

In an embodiment, the fluid streams from the first, second, and third conduits are combined at 1130 and the fluid streams from the fourth, fifth, and sixth conduits are combined at 1140. Such a combination may occur to minimize the lengths of the conduits when, for example, a first set of cylinders are in close proximity to one another (for example, on one side of a compressor) while a second set of cylinders are close to one another, but further from the first set of cylinders. In that way proximate flows can be joined and used to reduce pressure waves or pulsations quickly and close to the cylinders. The flows may furthermore be joined in one or more junctions such as side junctions 474, 476, 574, 576, 660, and 662.

Further in that embodiment, the fluid streams discharged from the first, second and third conduits may be directed into a seventh conduit of a second length at 1130 and the fluid streams discharged from the fourth, fifth and sixth conduits may be directed into an eighth conduit of a length equal to the second length at 1140. The gas discharged from the seventh and eighth conduits is then combined at 1150 and that combination may occur in a branch line junction such as one of branch line junctions 478, 578, and 678.

In various embodiments, the first and second lengths may be chosen to optimize or improve flow or power consumption or to improve both flow and power consumption.

Figure 12:
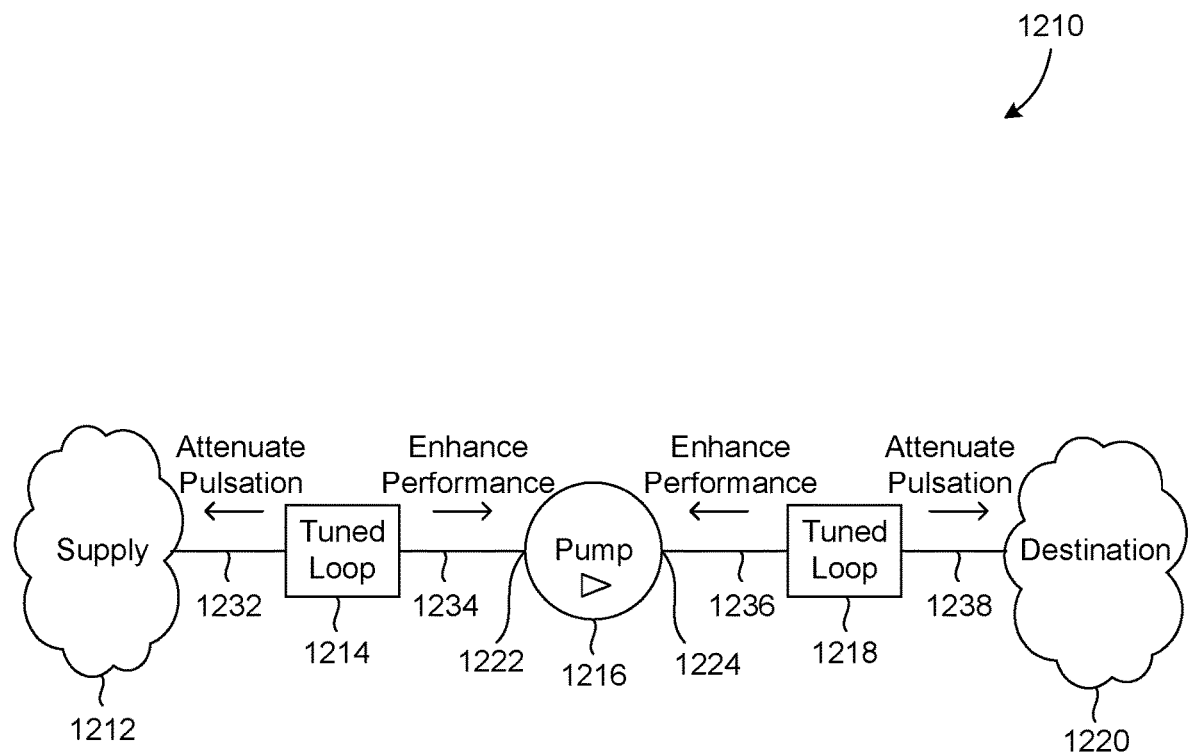
FIG. 12 illustrates an embodiment of a fluid pumping system employing aspects of the present invention.

FIG. 12 illustrates a fluid pumping system 1210, such as may be used in a natural gas pumping application. The fluid pumping system 1210 has a suction side 1222 and a discharge side 1224. Fluid is supplied to the suction side 1222 of the pump 1216 from a source system 1212, such as another pumping station in a natural gas pumping system. The fluid supplied to the pump 1216 passes through one or more suction side tuned loops 1214, such as the tuned loop 100 illustrated in FIG. 1 or the tuned loops 702 and 752 illustrated in FIG. 7 before reaching the pump 1216. The first pipe 1232 carries fluid from the source 1212 to the suction side tuned loop 1214 and the second pipe 1234 carries fluid from the suction side tuned loop 1214 to the pump 1216.

The fluid discharged from the pump 1216 also passes through one or more discharge side tuned loops 1218 (such as the tuned loop 100 illustrated in FIG. 1 or the tuned loops 702 and 752 illustrated in FIG. 7) after being discharged from the pump 1216 and before reaching its destination. That destination may, for example, be a home or another pumping station in a natural gas pumping system. Third pipe 1236 carries fluid from the pump 1216 to the discharge side tuned loop 1218 and fourth pipe 1238 carries fluid from the discharge side tuned loop 1218 to the destination 1220.

It should be recognized that the fluid pumping system 1210 illustrated in FIG. 12 is simple and that many more components may be situated between the source 1212 and the pump 1216 or between the pump 1216 and the destination 1220.

A first consideration in designing a tuned loop 1214 or 1218 may be to select appropriate dimensions for the first branch line (e.g., first branch line 116 illustrated in FIG. 1) and the second branch line (e.g., second branch line 122 illustrated in FIG. 1) to attenuate pulsations or pressure waves emanating from the pump 1216.

A second consideration in designing a tuned loop 1214 or 1218 may be to select appropriate length and area dimensions for the pipes 1232, 1234, 1236, and 1238. For example, the dimension of second pipe 1234 may be selected such that waves reflected from the suction side tuned loop 1214 back upstream toward the pump 1216 reach the pump 1216 at a time in the pump 1216 operation that causes the pump 1216 to be more efficient, to create more flow, or a combination of both. The dimension of third pipe 1236 may also be selected such that waves reflected from the discharge side tuned loop 1218 back toward the pump 1216 reach the pump 1216 at a time in the pump 1216 operation that causes the pump 1216 to be more efficient, to create more flow, or a combination of both.

Thus, the location of a pressure wave or pulsation attenuation network (e.g., 100, 440, 540, 600, 700, 800, and 900), components thereof, or another source of reflected waves in relation to the pump (e.g., 450, 550, 694, 806, and 906) or another source of pulsations, vibrations, or waves in fluid flowing through a system (e.g., 100, 440, 540, 600, 700, 800, and 900) may affect the quantity or efficiency of flow through the system (e.g., 100, 440, 540, 600, 700, 800, and 900). In an embodiment where the source of the pulsation is a reciprocating compressor (e.g., 450, 550, 694, 806, and 906) pumping natural gas through a natural gas piping system (e.g., 100, 440, 540, 600, 700, 800, and 900), a header pipe (e.g., headers 460, 462, 464, 466, 560, 562, 564, 566, 642, 644, 646, 648, 650, and 652 in FIGS. 4, 5, and 6) may be employed to carry the compressed gas from the compressor (e.g., 450, 550, 694, 806, and 906) to the system (e.g., 100, 440, 540, 600, 700, 800, and 900) and that header (e.g., headers 460, 462, 464, 466, 560, 562, 564, 566, 642, 644, 646, 648, 650, and 652) may have a particular length that may promote quantity or efficiency of fluid flow through the system (e.g., 100, 440, 540, 600, 700, 800, and 900).

Lengths and areas of piping on the intake side of the pump (e.g., 450, 550, 694, 806, and 906) or other source of pulsations, vibrations, or waves in fluid flowing through a system (e.g., 100, 440, 540, 600, 700, 800, and 900) may affect the efficiency of flow through the system (e.g., 100, 440, 540, 600, 700, 800, and 900) as well. In an embodiment where the source of a pressure wave that includes pressure peaks or pulsations is a reciprocating compressor (e.g., 450, 550, 694, 806, and 906) pumping natural gas through a natural gas piping system (e.g., 100, 440, 540, 600, 700, 800, and 900), an intake pipe (e.g., 590) may be employed to carry the compressed gas from the tuned loop (e.g., 100 and 580) to the compressor (e.g., 450, 550, 694, 806, and 906). That intake pipe (e.g., 590) may furthermore have a particular length that may promote quantity or efficiency of fluid flow through the system (e.g., 100, 440, 540, 600, 700, 800, and 900).

While the present invention has been disclosed with reference to certain embodiments, numerous modifications, alterations, and changes to the described embodiments are possible without departing from the scope of the present invention, as defined in the appended claims. Accordingly, it is intended that the present invention not be limited to the described embodiments, but that it have the full scope defined by the language of the following claims, and equivalents thereof.

What is claimed is:

1. A natural gas pumping system, comprising:
six double-acting reciprocating compressor cylinders, each cylinder including:
a first end;
a second end;
a piston reciprocating therein;
an inlet through which natural gas is received; and
an outlet through which natural gas is discharged;
the six reciprocating compressor cylinders arranged in pairs with three reciprocating compressor cylinders on a left side adjacent to three reciprocating compressor cylinders on a right side, wherein reciprocating cycles of the pistons in the three cylinders on the left side are offset by 60 degrees one from another, the reciprocating cycles of the pistons in the three cylinders on the right side are offset by 60 degrees one from another, and the reciprocating cycles of the pistons in the three cylinders on the right side are offset from the reciprocating cycles of the pistons in the three cylinders on the left side by 30 degrees such that pressure peak pulsations propagating from the reciprocating compressor cylinders on the left side occur at or near a midpoint in time between pressure peak pulsations propagating from the reciprocating compressor cylinders on the right side.

2. The natural gas pumping system of claim 1, wherein the six cylinders are operated by a single motor.

3. The natural gas pumping system of claim 2, wherein the single motor is connected to a first end of a shaft and a second end of the shaft is connected to the six pistons.

4. The natural gas pumping system of claim 1, wherein twelve pressure peak pulsations leave the six double-acting cylinder outlets at equally spaced time intervals per rotation of a shaft.

5. The natural gas pumping system of claim 1, wherein a first cylinder of the six cylinders reaches peak discharge pressure on a first of its two strokes per cycle at approximately 0 degrees of rotation of a shaft, a fourth cylinder of the six cylinders reaches discharge pressure on a first of its two strokes per cycle at approximately 30 degrees of the shaft rotation, a second cylinder of the six cylinders reaches peak discharge pressure on a first of its two strokes per cycle at approximately 60 degrees of the shaft rotation, a fifth cylinder of the six cylinders reaches peak discharge pressure on a first of its two strokes per cycle at approximately 90 degrees of the shaft rotation, a third cylinder of the six cylinders reaches peak discharge pressure on a first of its two strokes per cycle at approximately 120 degrees of the shaft rotation, and a sixth cylinder of the six cylinders reaches peak discharge pressure on a first of its two strokes per cycle at approximately 150 degrees of the shaft rotation.

6. The natural gas pumping system of claim 1, wherein a first cylinder of the six cylinders reaches peak discharge pressure on a second of its two strokes per cycle at approximately 180 degrees of rotation of a shaft, a fourth cylinder of the six cylinders reaches peak discharge pressure on a second of its two strokes per cycle at approximately 210 degrees of the shaft rotation, a second cylinder of the six cylinders reaches peak discharge pressure on a second of its two strokes per cycle at approximately 240 degrees of the shaft rotation, a fifth cylinder of the six cylinders reaches peak discharge pressure on a second of its two strokes per cycle at approximately 270 degrees of the shaft rotation, a third cylinder of the six cylinders reaches peak discharge pressure on a second of its two strokes per cycle at approximately 300 degrees of the shaft rotation, and a sixth cylinder of the six cylinders reaches peak discharge pressure on a second of its two strokes per cycle at approximately 330 degrees of the shaft rotation.

7. A natural gas pumping system, comprising:
six double-acting reciprocating compressors, each including:
a cylinder having:
a first end;
a second end;
a piston reciprocating therein;
an inlet through which natural gas is received; and
an outlet through which natural gas is discharged;
the six reciprocating compressor cylinders arranged in pairs with three reciprocating compressor cylinders on the left adjacent to three reciprocating compressor cylinders on the right, wherein reciprocating cycles of the pistons in the three cylinders on the left are offset by 120 degrees one from another, reciprocating cycles of the pistons in the three cylinders on the right are offset by 120 degrees one from another, and the reciprocating cycles of the pistons in the three cylinders on the right are offset from the reciprocating cycles of the pistons in the three cylinders on the left by 30 degrees such that pressure peak pulsations propagating from the reciprocating compressor cylinders on the left side occur at or near a midpoint in time between pressure peak pulsations propagating from the reciprocating compressor cylinders on the right side.

8. The natural gas pumping system of claim 7, wherein the six cylinders are operated by a single motor.

9. The natural gas pumping system of claim 8, wherein the single motor is connected to a first end of a shaft and a second end of the shaft is connected to the six pistons.

10. The natural gas pumping system of claim 7, wherein the six cylinders are double acting.

11. The natural gas pumping system of claim 10, wherein twelve pressure peak pulsations leave the six double-acting cylinder outlets at equally spaced time intervals per rotation of a shaft.

12. The natural gas pumping system of claim 10, wherein a first cylinder of the six cylinders reaches peak discharge pressure on a first of its two strokes per cycle at approximately 0 degrees of rotation of a shaft, a fourth cylinder of the six cylinders reaches discharge pressure on a first of its two strokes per cycle at approximately 30 degrees of the shaft rotation, a second cylinder of the six cylinders reaches peak discharge pressure on a first of its two strokes per cycle at approximately 60 degrees of the shaft rotation, a fifth cylinder of the six cylinders reaches peak discharge pressure on a first of its two strokes per cycle at approximately 90 degrees of the shaft rotation, a third cylinder of the six cylinders reaches peak discharge pressure on a first of its two strokes per cycle at approximately 120 degrees of the shaft rotation, and a sixth cylinder of the six cylinders reaches peak discharge pressure on a first of its two strokes per cycle at approximately 150 degrees of the shaft rotation.

13. The natural gas pumping system of claim 10, wherein a first cylinder of the six cylinders reaches peak discharge pressure on a second of its two strokes per cycle at approximately 180 degrees of rotation of a shaft, a fourth cylinder of the six cylinders reaches peak discharge pressure on a second of its two strokes per cycle at approximately 210 degrees of the shaft rotation, a second cylinder of the six cylinders reaches peak discharge pressure on a second of its two strokes per cycle at approximately 240 degrees of the shaft rotation, a fifth cylinder of the six cylinders reaches peak discharge pressure on a second of its two strokes per cycle at approximately 270 degrees of the shaft rotation, a third cylinder of the six cylinders reaches peak discharge pressure on a second of its two strokes per cycle at approximately 300 degrees of the shaft rotation, and a sixth cylinder of the six cylinders reaches peak discharge pressure on a second of its two strokes per cycle at approximately 330 degrees of the shaft rotation.

\* \* \* \* \*